(12) United States Patent
Takiguchi et al.

(10) Patent No.: US 9,781,375 B2
(45) Date of Patent: Oct. 3, 2017

(54) TELEVISION RECEIVING APPARATUS AND TELEVISION RECEIVING METHOD

(71) Applicant: Sony Corporation, Tokyo (JP)

(72) Inventors: Yasunari Takiguchi, Tokyo (JP); Takahiro Furuya, Kanagawa (JP); Tomonori Nakajima, Tokyo (JP); Mitsuru Ikeda, Tokyo (JP); Hiroyuki Shimizu, Saitama (JP); Masaru Fujii, Tokyo (JP); Toshikazu Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/895,732

(22) PCT Filed: Mar. 27, 2014

(86) PCT No.: PCT/JP2014/001760
§ 371 (c)(1),
(2) Date: Dec. 3, 2015

(87) PCT Pub. No.: WO2014/199543
PCT Pub. Date: Dec. 18, 2014

(65) Prior Publication Data
US 2016/0142664 A1    May 19, 2016

(30) Foreign Application Priority Data
Jun. 13, 2013 (JP) .................. 2013-124315

(51) Int. Cl.
*H04N 5/63* (2006.01)
*H04N 5/50* (2006.01)
(Continued)

(52) U.S. Cl.
CPC .................. *H04N 5/63* (2013.01); *H04N 5/50* (2013.01); *H04N 21/4382* (2013.01); *H04N 21/4436* (2013.01)

(58) Field of Classification Search
CPC .. H04N 21/4382; H04N 21/4436; H04N 5/50; H04N 5/63; H04N 5/44; H04N 5/4401
(Continued)

(56) References Cited

U.S. PATENT DOCUMENTS 5,842,119 A * 11/1998 Emerson .............. H04B 1/1027
455/154.2
8,869,213 B2    10/2014 Imai et al.
(Continued)

FOREIGN PATENT DOCUMENTS

JP    2002-118483 A    4/2002
JP    2005-045508 A    2/2005
(Continued)

OTHER PUBLICATIONS

Extended European Search Report dated Apr. 10, 2017 in connection with European Application No. 14810712.1.

*Primary Examiner* — Sherrie Hsia
(74) *Attorney, Agent, or Firm* — Wolf, Greenfield & Sacks, P.C.

(57) ABSTRACT

A receiving apparatus includes a receiving unit that receives expected waves, and a control unit that sets the receiving unit to an operational state that has a lower electricity consumption within a range in which reception performance is allowed, depending on interference waves with respect to the expected waves that the receiving unit receives.

13 Claims, 26 Drawing Sheets

(51) Int. Cl.
*H04N 21/438* (2011.01)
*H04N 21/443* (2011.01)

(58) Field of Classification Search
USPC ...................... 348/725, 730–733; 725/33, 58
IPC ........................................ H04N 5/63, 5/50, 5/44
See application file for complete search history.

(56) References Cited

U.S. PATENT DOCUMENTS

| | | |
|---|---|---|
| 9,479,722 B2 | 10/2016 | Tsukahara et al. |
| 9,484,972 B2 | 11/2016 | Nakajima et al. |
| 2002/0061773 A1 | 5/2002 | Adachi et al. |
| 2007/0275680 A1 | 11/2007 | Kaiki et al. |
| 2010/0259109 A1 | 10/2010 | Sato |
| 2010/0262846 A1 | 10/2010 | Sato |
| 2011/0051012 A1 | 3/2011 | Miyazaki |
| 2011/0247041 A1 | 10/2011 | Imai et al. |
| 2012/0113324 A1 | 5/2012 | Yoshida et al. |
| 2015/0319395 A1 | 11/2015 | Tsukahara et al. |
| 2015/0372704 A1 | 12/2015 | Nakajima et al. |
| 2015/0382049 A1 | 12/2015 | Fujii et al. |
| 2016/0028422 A1 | 1/2016 | Shimizu et al. |
| 2016/0065882 A1* | 3/2016 | Shin .................... H04N 5/50 348/731 |
| 2017/0033820 A1 | 2/2017 | Nakajima et al. |

FOREIGN PATENT DOCUMENTS

| | | |
|---|---|---|
| JP | 2008-011485 A | 1/2008 |
| JP | 2011-045139 A | 3/2011 |
| JP | 2011-055114 A | 3/2011 |

\* cited by examiner

FIG. 19
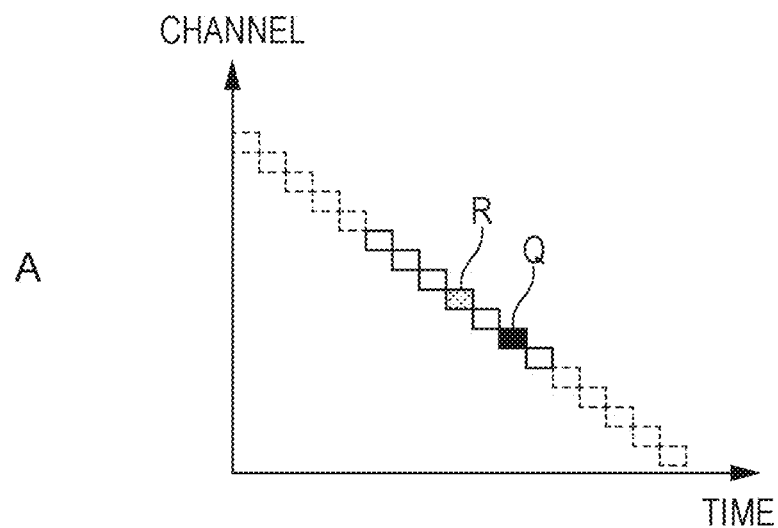
A
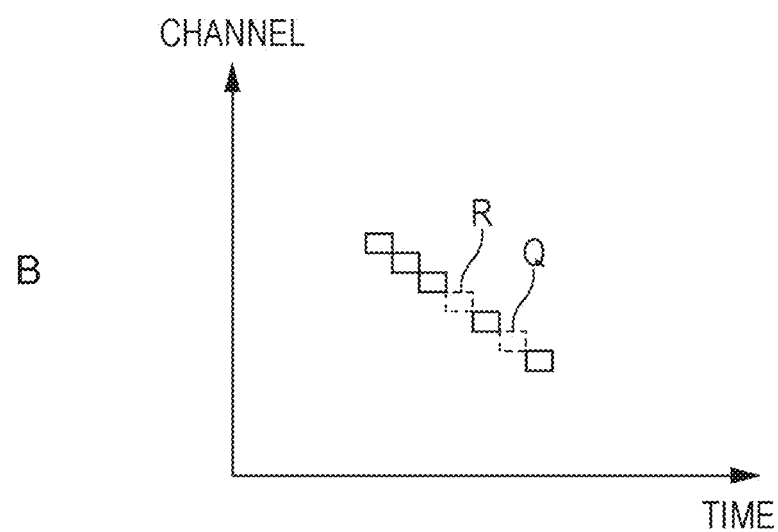
B

TELEVISION RECEIVING APPARATUS AND TELEVISION RECEIVING METHOD

TECHNICAL FIELD

The present disclosure relates to a television receiving apparatus and a television receiving method for receiving a television broadcast such as a terrestrial digital broadcast.

BACKGROUND ART

In tuners of the related art that receive television broadcasts and the like, required specifications are set so that anticipated characteristics are even secured in severe reception environments such as when the signal strength of expected waves is weak, or the signal strength of interference waves is strong with respect to the signal strength of expected waves. However, there are many cases in which effective reception environments are not as severe as assumed. As a result of this, reception in a state in which a residue remains in the reception performance of the tuner is performed. Generally, since, in comparison with a case in which reception performance is low, electricity consumption is large in a case in which reception performance is high, there is a problem in that there is an excessive waste of electricity.

Furthermore, structures of emergency warning broadcasts (hereinafter, referred to as the Emergency Warning System: EWS as appropriate) for notifying viewers of emergency information by the receiver automatically starting up when disasters such as earthquakes and tsunamis have occurred, have been established. In digital broadcasts, the EMS is realized by incorporating a special start-up bit in the Transmission and Multiplexing Configuration Control (TMCC), and making use of transmission control information PSI (Program Specific Information). There is a problem in that even if the television receiver is not being viewed, in order to receive the EWS, it is necessary for the tuner to be in operation, and therefore, it is not possible to reduce the standby power of the television receiver due to the operation of the tuner.

PTL 1 discloses an adaptive modulation method that switches a modulation method depending on the status of a circuit, in which the electricity consumption is reduced by switching between two pathways that have different electricity usages as power amplification pathways.

CITATION LIST

Patent Literature

PTL 1: Japanese Unexamined Patent Application Publication No. 2011-45139

SUMMARY OF INVENTION

Technical Problem

A problem is that since the method that is disclosed in PTL 1 relates to an adaptive modulation method, it is not possible to apply this method to a television receiving apparatus.

Therefore, the object of the present disclosure is to provide a television receiving apparatus and a television receiving method that are capable of cutting down on electricity consumption while securing performance that receives desired airwaves in a television receiving apparatus.

Solution to Problem

In order to solve the abovementioned problem, the present disclosure is a television receiving apparatus that includes a receiving unit that receives expected waves, and a control unit that sets the receiving unit to an operational state that has a lower electricity consumption within a range in which reception performance is allowed, depending on interference waves with respect to the expected waves that the receiving unit receives.

In the present disclosure, it is preferable that the receiving unit be set to the operational state that has a lower electricity consumption within a range in which reception performance is allowed, by the control unit when on stand-by for the reception of an emergency warning signal.

Furthermore, a channel that has the expected waves and a signal strength of the corresponding channel are acquired by a channel scan, acquired information is stored as channel scan data, and the control unit uses the channel scan data, and sets the receiving unit to an operational state that has a lower electricity consumption within a range in which reception performance is allowed, depending on a relationship between the expected waves and the interference waves.

Advantageous Effects of Invention

According to the present disclosure, it is possible to reduce electricity consumption by preventing a circumstance in which a selection characteristic of a filter, for example, of the receiving unit is set to a higher performance than is required. Additionally, the effect that is disclosed here is not necessarily limited, and any effect that is disclosed in the present disclosure may be exhibited. In addition, the contents of the present disclosure should not be interpreted as being limited by the exemplified effects.

BRIEF DESCRIPTION OF DRAWINGS

FIGS. 19A and 19B are schematic drawings that are used in the description of a problematic point that is solved by a seventh embodiment of the present disclosure.

DESCRIPTION OF EMBODIMENTS

The embodiments that are described below are preferred concrete examples of the present disclosure, and various technically preferable limitations have been added thereto. However, in the following description, the scope of the present disclosure is not limited to these embodiments unless there is no particular mention of limiting the present disclosure.

The following description will be given according to the order presented below.
<1. First Embodiment>
<2. Second Embodiment>
<3. Third Embodiment>
<4. Fourth Embodiment>
<5. Fifth Embodiment>
<6. Sixth Embodiment>
<7. Seventh Embodiment>
<8. Eighth Embodiment>
<9. Modification Example>

1. First Embodiment

Figure 1:
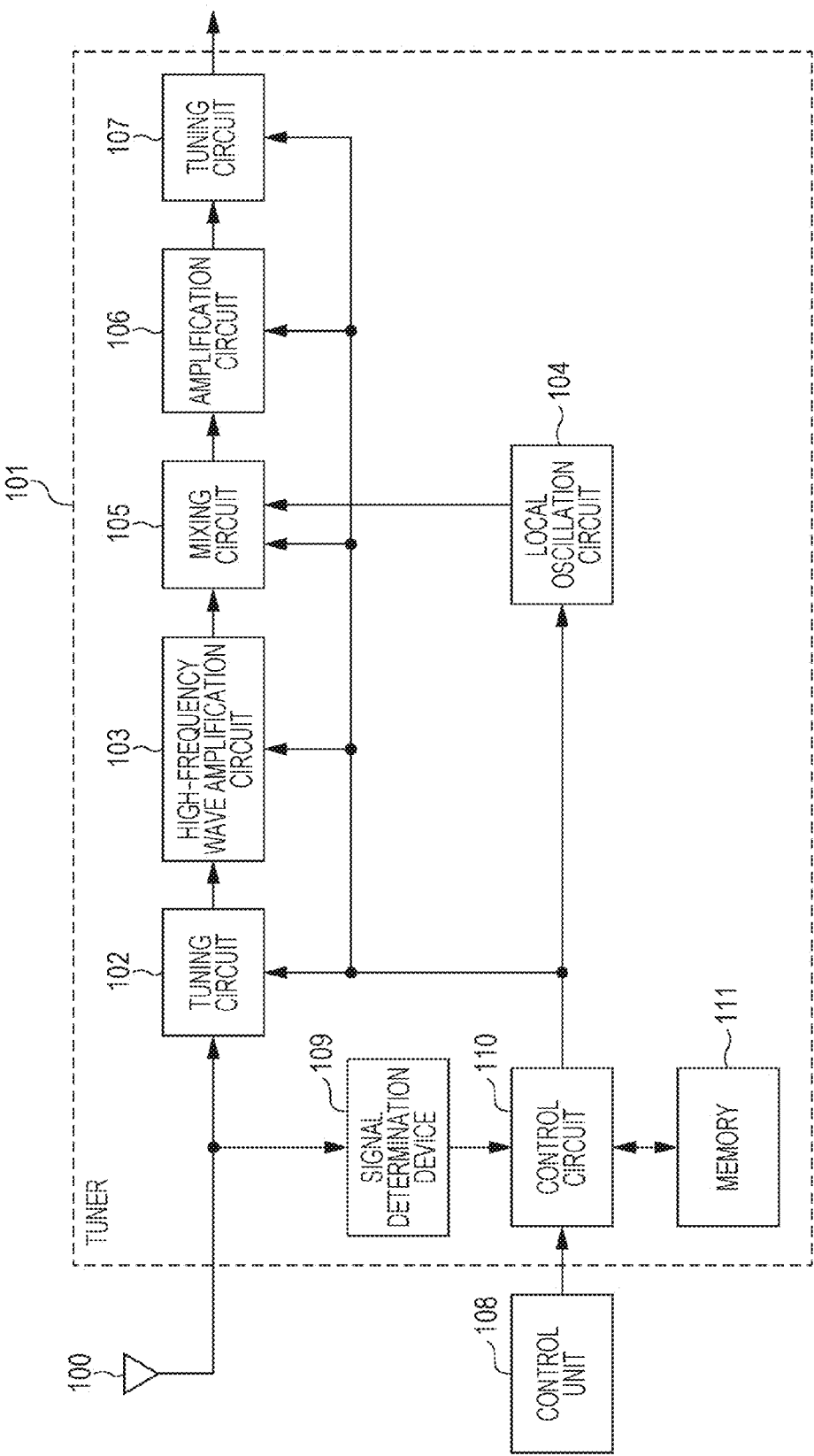
FIG. 1 is a block diagram of a tuner in a first embodiment of the present disclosure.

A first embodiment of the present disclosure will be described with reference to FIG. 1. A signal that is received by an antenna 100 is supplied to a tuned circuit 102 of a terrestrial digital broadcast tuner 101, for example. Additionally, in a receiving apparatus, the term tuner is used as a term that refers to a portion that performs a tuning operation or the like, or a portion in which a demodulation circuit is added to such a portion in a receiving apparatus. Furthermore, a tuner module means a tuner of a stand-alone component that has an IC built into the case thereof. Additionally, in the configuration of FIG. 1, a configuration that does not include a demodulation circuit is set.

The tuned circuit 102 is provided with a band limitation filter, and among RF (Radio Frequency) signals that are supplied from the antenna 100, the levels of signals outside a band of channels desired by a user are reduced by the band limitation filter on the basis of the control of a control circuit 110. The tuned circuit 102 sets selection channels. A signal from which interference waves have been removed by the tuned circuit 102 is supplied to a high-frequency wave amplification circuit 103. A signal that has been amplified to a desired level by the high-frequency wave amplification circuit 103 is supplied to a mixing circuit 105.

A local oscillation signal is supplied to the mixing circuit 105 from a local oscillation circuit 104. Frequency conversion is performed in the mixing circuit 105. The local oscillation signal is set to a frequency that corresponds to a desired channel. The mixing circuit 105 mixes an RF signal and the local oscillation signal and performs down-conversion thereof to an intermediate frequency wave signal with an intermediate frequency.

The intermediate frequency wave signal (an expected wave signal) of a predetermined frequency of the mixing circuit 105 is amplified to a desired level by an amplification circuit 106, and supplied to a tuned circuit 107. Interference wave signals are removed by the tuned circuit 107. For example, signals that lead to image interference are attenuated or removed by the tuned circuit 107. An output signal of the tuned circuit 107 is supplied to a demodulation unit, for example, a demodulation unit of an Integrated Services Digital Broadcasting Terrestrial (ISDB-T) method. A transport stream (TS) is obtained by the demodulation unit. The demodulation unit includes a demodulation circuit, an error correction unit, and a transport stream decoding unit.

A control circuit 110 is provided in order to control the tuner 101. The control circuit 110 is connected to a superordinate control unit 108 through a control line. A memory 111 with a non-volatile memory configuration is provided in association with the control circuit 110. Furthermore, a determination signal is supplied to the control circuit 110 from a signal determination device 109. The signal determination device 109 detects the level of a signal that is received, and information of the detected level is supplied to the control circuit 110. Information of the level of a received signal that is supplied from the signal determination device 109 is stored in the memory 111.

Furthermore, the control circuit 110 controls the local oscillation circuit 104 so that the local oscillation circuit 104 oscillates at a local oscillation frequency for suppressing an effect of received interference that becomes image interference, depending on selection channels. More specifically, a local oscillation frequency, which depends on selection channels, for suppressing the effect of received interference depending on selection channels is set. A setting value for setting the local oscillation frequency is stored for each channel in a table that the memory 111 is provided with. The control circuit 110 selectively reads the setting value and the setting value is supplied to the local oscillation circuit 104. The local oscillation circuit 104 generates a local oscillation signal of a local oscillation frequency that corresponds to the setting value that is supplied from the control circuit 110, and the local oscillation signal is supplied to the mixing circuit 105.

In the abovementioned manner, the tuned circuit 107 suppresses interference wave signals so that a ratio (hereinafter, referred to as DU) of the levels of interference wave signals (U) with respect to the level of an expected wave signal (D) becomes a desired value. In this case, required selection characteristics of an expected wave signal are dependent on the DU of a received signal in the antenna 100, and DUs at which reception can be performed is defined by a standard. There are many cases in which the tuned circuit 107 is set as a band-pass filter that is configured from multiple stages. In this kind of band-pass filter, as the order of the filters increases, while selection characteristics become more favorable, circuit size and a consumption current increase.

Figure 2:
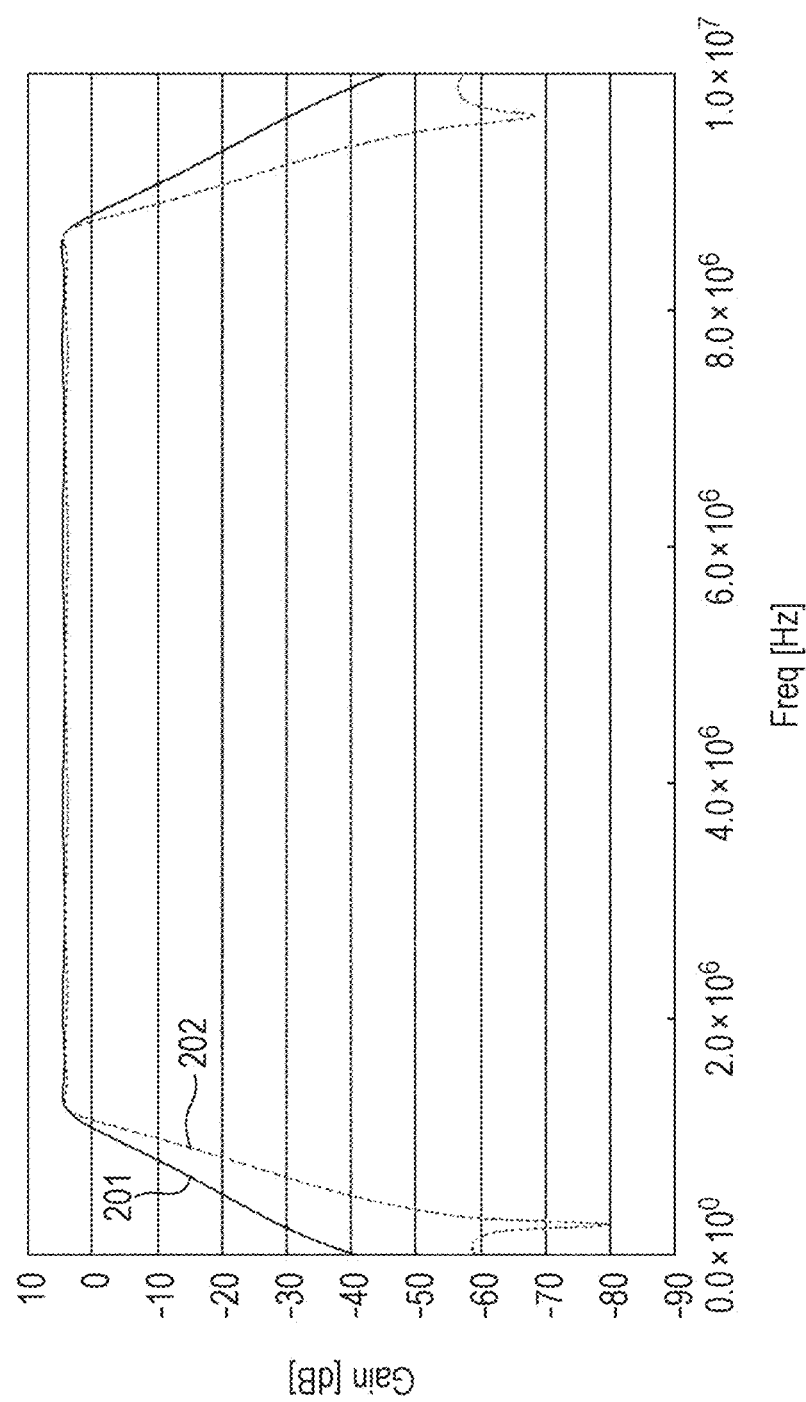
FIG. 2 is a graph that shows an example of selection characteristics of a tuned circuit of a tuner.

FIG. 2 shows an example of the selection characteristics of the tuned circuit 107. In FIG. 2, a solid line 201 shows the selection characteristics of a senary band-pass filter, and a dotted line 202 shows the selection characteristics of an octonary band-pass filter. The selection characteristics of the octonary band-pass filter (the dotted line 202) have steeper characteristics, and therefore, are understood to be superior.

Table 1 respectively shows an adjacent interference characteristic and a consumption current of the senary band-pass filter and the octonary band-pass filter. As an example, an interference suppression ratio of a case in which an interference wave is from an upper side adjacent channel (N+1ch) of an expected wave and respective consumption currents are shown. The interference suppression ratios according to the selection characteristics are senary band-pass filter: −33.2 dB and octonary band-pass filter: −36.2 dB, and the octonary band-pass filter is more favorable. However, the consumption current is senary band-pass filter: 31 mA, and octonary band-pass filter: 42 mA, and the octonary band-pass filter is larger.

TABLE 1

|  | Reception System | Measured Article | Senary Band-pass Filter | Octonary Band-pass Filter | Unit |
| --- | --- | --- | --- | --- | --- |
| Adjacent Interference Characteristic | DVB-T2 8 MHz | N+1ch Interference | −33.2 | −36.2 | dB |
| Consumption Current |  |  | 31 | 42 | mA |

In an effective signal environment, it is rare for it to be necessary for the DU with an upper side adjacent channel to be restricted to −33.2 dB, and in many cases, the performance of a tuned circuit of the senary filter is sufficient. However, even under extremely strict signal conditions, there are many cases in which an octonary band-pass filter is adopted in order to secure reception performance. In consideration of the abovementioned point, the present disclosure surveys a reception environment using the signal determination device 109, and sets the order of the tuned circuit 107 with respect to the reception environment. According to the present disclosure, it is possible to reduce the electricity consumption in the tuned circuit 107.

Furthermore, when a television receiver enters an EWS reception standby state, the tuner is not used for the primary applications thereof such as viewing and recording, and it is necessary for the television receiver to be in operation for EWS reception. In EWS reception, the tuner monitors a start-up flag for TMCC emergency warning broadcasts, and after this flag has changed to 1 from 0, the tuner monitors an emergency information descriptor which is in a Program Map Table (PMT) of a received transport stream.

Even in cases in which the transmission parameters in effective broadcasts are, for example, 64 Quadrature Amplitude Modulation (QAM), the TMCC is transmitted by Differential Binary Phase Shift Keying (DBPSK). Since in comparison with 64 QAM, DBPSK is capable of alleviating a DU of 15 dB or more, even if an octonary filter is required in primary applications such as viewing and recording, it is possible to set a senary filter in an EWS reception standby state.

Figure 3:
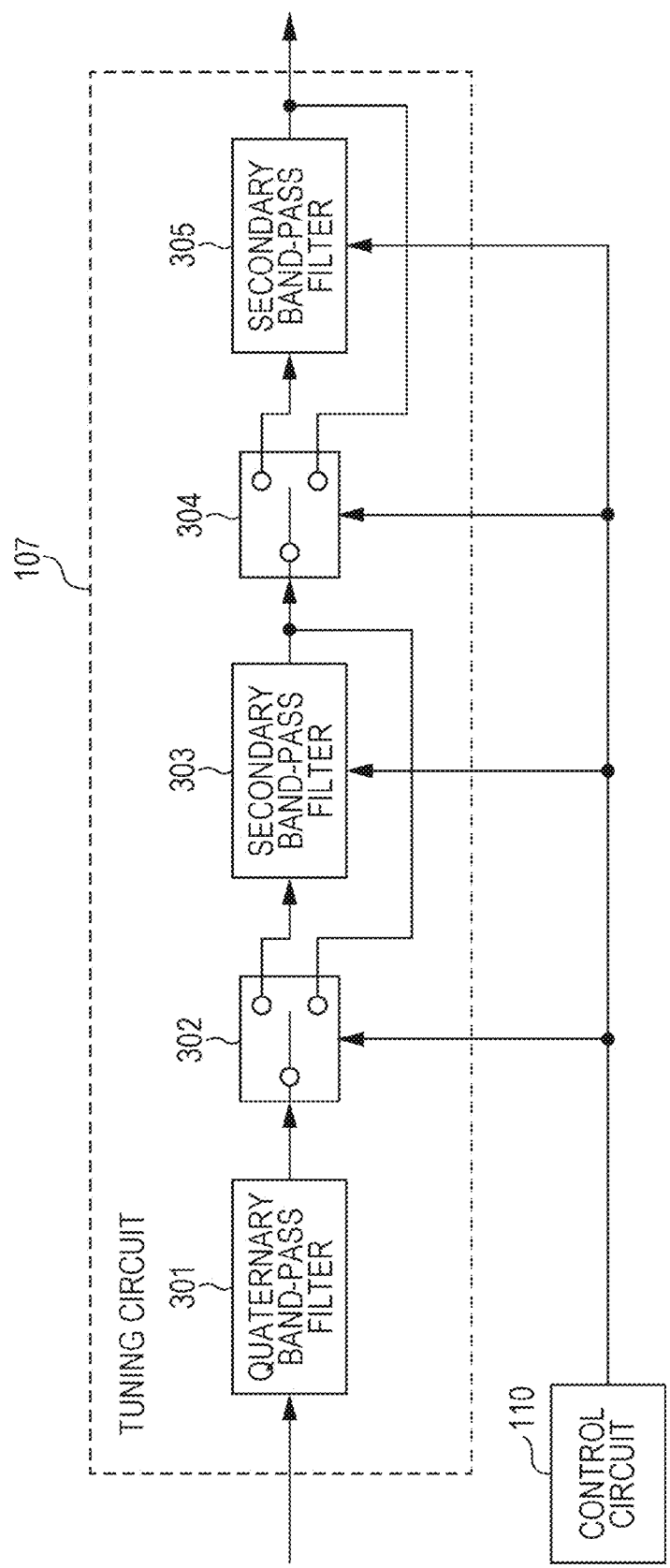
FIG. 3 is a block diagram of an example of the tuned circuit in the first embodiment.

As shown in FIG. 3, the tuned circuit 107 in the first embodiment of the present disclosure is configured from a quaternary band-pass filter 301, a switch 302, a secondary band-pass filter 303, a switch 304 and a secondary band-pass filter 305. The switches 302 and 304 are controlled by the control circuit 110. The switch 302 switches between outputting an output signal of the quaternary band-pass filter 301 to the secondary band-pass filter 303 and ignoring the secondary band-pass filter 303. The switch 304 switches between outputting an output signal of the secondary band-pass filter 303 to the secondary band-pass filter 305 and ignoring the secondary band-pass filter 305. In the configuration of FIG. 3, it is made so that it is possible to switch the order of the tuned circuit 107 between octonary, senary and quaternary depending on the connection states of the switches 302 and 304.

Furthermore, in a case of being ignored by the switch 302, the secondary band-pass filter 303 is controlled to a sleep state (a non-operational state) by the control circuit 110. In the same manner, in a case of being ignored by the switch 304, the secondary band-pass filter 305 is controlled to a sleep state (a non-operational state) by the control circuit 110. In the sleep state, electricity consumption is lower than an operational state. In this manner, by converting the order of the tuned circuit 107 to quaternary, senary or octonary according to necessity, and setting unused band-pass filters to a sleep state, it is possible to achieve power saving.

For example, when a television receiver enters an EWS reception standby state, the tuned circuit 107 is set to a configuration of the quaternary band-pass filter or the senary band-pass filter. As a result of this, it is possible to cut down on electricity consumption in the EWS reception standby state. Additionally, in FIG. 3, an octonary band-pass filter is configured by a total of three stages of a quaternary band-pass filter, a secondary band-pass filter and a secondary band-pass filter, but it is possible to choose other numbers for the number of stages and the order as appropriate.

2. Second Embodiment

Furthermore, in a second embodiment of the present disclosure, in a channel scan, for example, the level of a signal that is received is detected by the signal determination device 109, and information of the level of a received signal that is detected is stored in the memory 111 by the control circuit 110. In the related art, in a case in which a television receiver has been newly purchased, a channel scan of the related art is an operation that investigates the presence or absence of airwaves such as a terrestrial digital broadcast in an installation location, and automatically allocates a receivable broadcast channel to a button of a remote control. In the present disclosure, in addition to this, information of the level of a received signal is stored in the memory 111.

Processes during a channel scan will be described with reference to the flowchart of FIG. 4. In Step S1, retrieval is initiated.

Step S2: A retrieval initiation frequency is set to X.

Step S3: A frequency X is selected as a channel.

Step S4: It is determined whether or not a signal is absent. This determination is made using a determination result of the signal determination device 109.

Step S5: In a case in which the determination result of Step S4 is that a signal is absent, it is determined whether or not the frequency X is a retrieval conclusion frequency.

Step S6: Retrieval is concluded in a case in which the determination result of Step S5 is affirmation.

Step S7: In a case in which the determination result of Step S4 is negation, that is, a signal is present, the corresponding frequency (channel) is added to a present signal (candidate) list along with the level of the signal. Further, the process proceeds to Step S5. In the abovementioned manner, it is determined whether or not the frequency X is a retrieval conclusion frequency.

Step S8: In a case in which the determination result of Step S5 is negation, that is, a case in which it is determined that the frequency X is not a retrieval conclusion frequency, a frequency (X+Y) of a subsequent channel in which a predetermined frequency Y has been added to the frequency X, is set as a subsequent retrieval target frequency.

Figure 5:
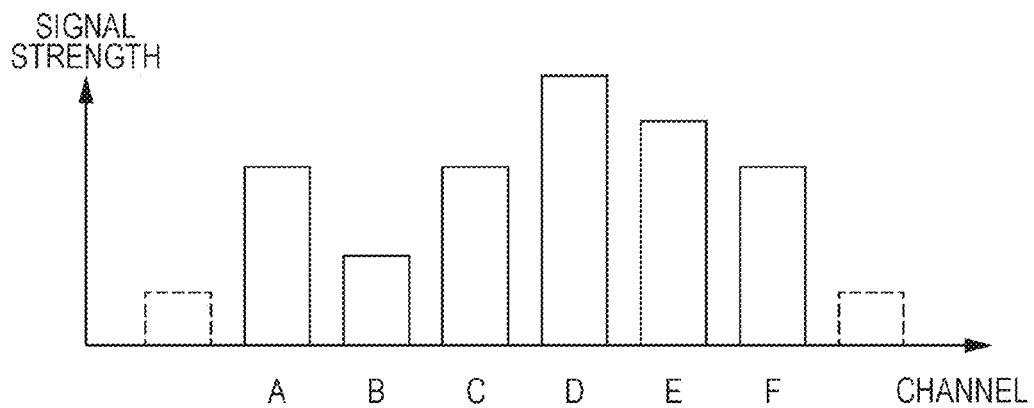
FIG. 5 is a schematic drawing of an example of channel scan data that is acquired by a channel scan.

In terrestrial digital broadcasts, a scan is concluded when a predetermined frequency band, for example, the UHF (13 to 52 channels) band is scanned. As shown schematically in FIG. 5, it is determined that there is a signal on channels A, B, C, . . . , and F. In this case, as an example, a list such as that of Table 2 is created and stored in the memory 111. In this manner, data (a list of channels and signal strengths) that is acquired by the channel scan is referred to as channel scan data. Additionally, an Automatic Gain Control (AGC) level for AGC may be used as the signal strength.

TABLE 2

| CH | A | B | C | D | E | F | Unit |
|---|---|---|---|---|---|---|---|
| Level | 49 | 29 | 49 | 84 | 74 | 49 | dBu |

Figure 6:
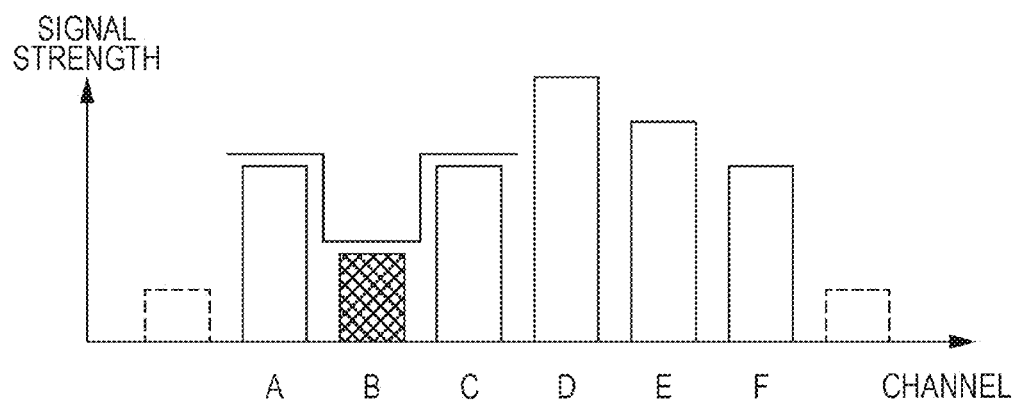
FIG. 6 is a schematic drawing that is used in the description of the second embodiment of the present disclosure.

In a case of receiving a channel by referring to the channel scan data, the reception performance of the tuned circuit 107 is controlled. That is, the tuned circuit 107 is controlled so as to operate with as great an electrical power saving as possible while maintaining the necessary reception performance. For example, as shown in FIG. 6 and Table 3, in a case of receiving a channel B, a difference with the signal strengths of the channels above and below the channel B is calculated. Table 3 calculates the DU (a difference Δ) of the other channels with respect to the channel B.

TABLE 3

| CH | A | B | C | D | E | F | Unit |
|---|---|---|---|---|---|---|---|
| Level | 49 | 29 | 49 | 84 | 74 | 49 | dBu |
| Difference Δ | -20 | — | -20 | -71 | -45 | -20 | dB |

From Table 3, it is understood that the DU with a channel C, which is the upper side adjacent channel when viewed from the channel B, is −20 dB. Therefore, as described above, if, for example, DVB-T2 reception is used, in the tuned circuit 107, it is understood that the octonary band-pass filter is not necessary, and therefore, the senary band-pass filter is sufficient. Therefore, the tuned circuit 107 is set to the configuration of the senary band-pass filter.

Figure 7:
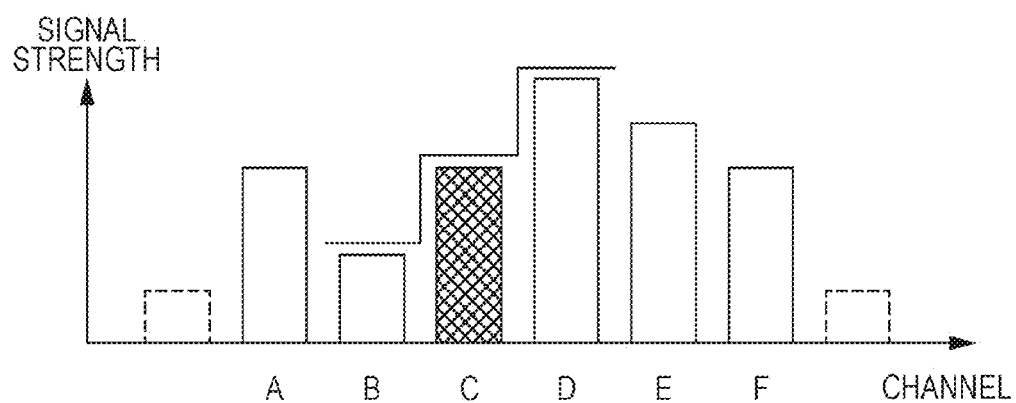
FIG. 7 is a schematic drawing that is used in the description of the second embodiment of the present disclosure.

FIG. 7 and Table 4 show another example. In the example, in a case of receiving the channel C, a difference with the signal strengths of the channels above and below the channel C is calculated. Table 4 calculates the DU (the difference Δ) of the other channels with respect to the channel C.

TABLE 4

| CH | A | B | C | D | E | F | Unit |
|---|---|---|---|---|---|---|---|
| Level | 49 | 29 | 49 | 84 | 74 | 49 | dBu |
| Difference Δ | 0 | -20 | — | -35 | -25 | 0 | dB |

From Table 4, it is understood that the DU with a channel D, which is the upper side adjacent channel when viewed from the channel C, is −35 dB. Therefore, as described above, if, for example, DVB-T2 reception is used, in the tuned circuit 107, the senary band-pass filter is insufficient, and therefore, it is possible to discern that the octonary band-pass filter is necessary. Therefore, the tuned circuit 107 is set to the configuration of the octonary band-pass filter.

According to the second embodiment that is described above, it is possible to optimally set the selection characteristics of the tuned circuit 107 on the basis of the channel scan data, and therefore, it is possible to achieve power saving.

3. Third Embodiment

A third embodiment is the same as the abovementioned second embodiment in a feature of optimizing the selection characteristics of the tuned circuit 107 on the basis of the channel scan data. The third embodiment sets a retrieval initiation frequency of the channel scan and a retrieval conclusion frequency to a range that is selectable as a channel of the tuner rather than a range of a television airwave.

For example, the tuner can select a range (from 46 MHz to 1 GHz) as a channel. The frequency of terrestrial digital broadcast television airwaves within Japan is from 93 MHz to 767 MHz. Therefore, 93 MHz and 767 MHz are set as the retrieval initiation frequency and the retrieval conclusion frequency of a tuner of the related art. In the third embodiment, the retrieval initiation frequency is set from 46 MHz or more to 93 MHz or less, and the retrieval conclusion frequency is set from 767 MHz or more to 1 GHz or less. It is suitable if at least either one of a low-pass side and a high-pass side of television airwaves is expanded.

Figure 8:
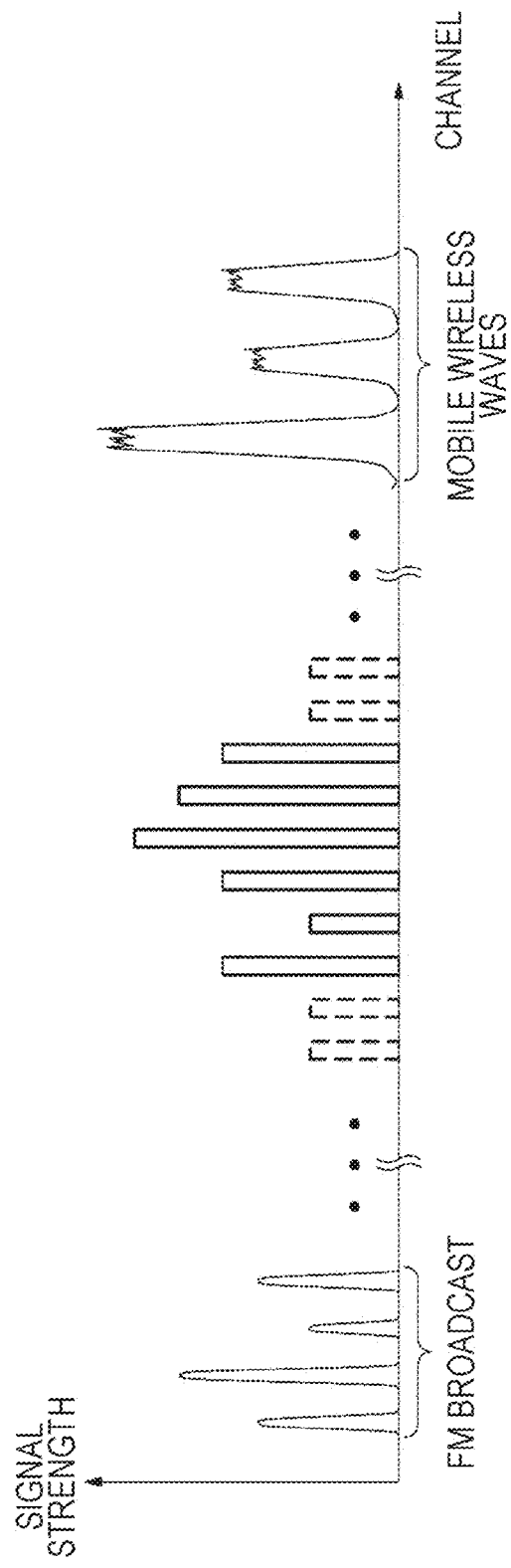
FIG. 8 is a schematic drawing that shows an example of a presence state of radio waves, which is used in the description of a third embodiment of the present disclosure.

In this manner, by also setting frequency bands other than the frequency bands of television airwaves as a retrieval frequency range during the channel scan, as shown in FIG. 8, it is possible to detect signals other than television airwaves such as FM airwaves (76 to 90 MHz) and mobile wireless waves (770 to 960 MHz) that exist in those frequency bands.

Therefore, channel scan data (a list) such as that shown in Table 5 is created by detecting the presence or absence of signals and the signal strength thereof during the channel scan. Further, the levels of interference waves are recognized, and therefore, optimal settings are possible based on the reception environment.

TABLE 5

| CH | FM-A | FM-B | FM-C | FM-D | A | B | C | D | E | F | Mobile-A | Mobile-A | Mobile-A | Unit |
|---|---|---|---|---|---|---|---|---|---|---|---|---|---|---|
| Level | 50 | 74 | 85 | 50 | 49 | 29 | 49 | 84 | 74 | 49 | 90 | 50 | 55 | dBu |

Figure 9:
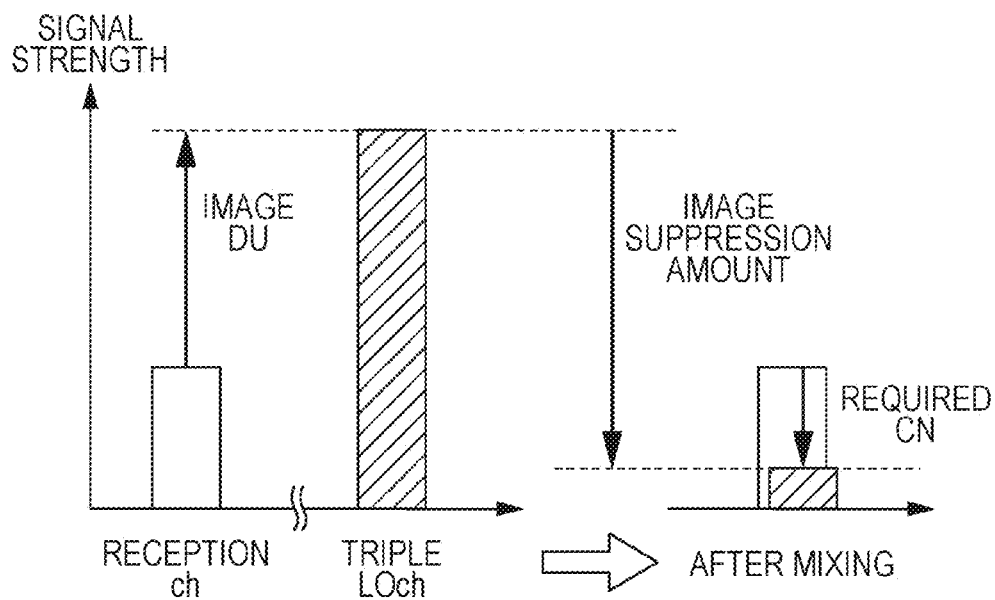
FIG. 9 is a schematic drawing that shows an example of the control of an image cancelling circuit.

FIG. 9 shows a case in which the levels of signals other than television airwaves such as FM airwaves and mobile wireless waves, and television airwaves are acquired, and processes in a case in which an environment in which an image cancelling circuit is not necessary is, detected. In this case, it is set so that the image cancelling circuit is set to a sleep state by the control circuit 110, and therefore, electricity consumption is suppressed. As shown in FIG. 9, the DU is improved by an amount of an image suppression amount by the image cancelling circuit that is provided in the mixing circuit with respect to an image D, which is a difference between a received ch (channel) and interference waves at an image frequency, and reception is possible if an SI ratio thereof is a required CN or less.

Table 6 shows an image cancelling suppression amount and the consumption current of a given tuner depending on whether or not the image cancelling circuit is in operation. If it is possible to discern that a received channel and an image DU is 19 dB, it is possible to determine that the image cancelling circuit is not necessary, and therefore, it is possible to cut down on current by 10 mA.

TABLE 6

| | | Image Cancelling Circuit | | |
|---|---|---|---|---|
| | Reception System | In Operation | Not In Operation | Unit |
| Image Suppression Amount | DVB-T2 8 MHz | 60 | 0 | dB |
| Allowable Image DU | (Required CN 19 dB) | −41 | 19 | dB |
| Consumption Current | — | 260 | 250 | mA |

Figure 10:
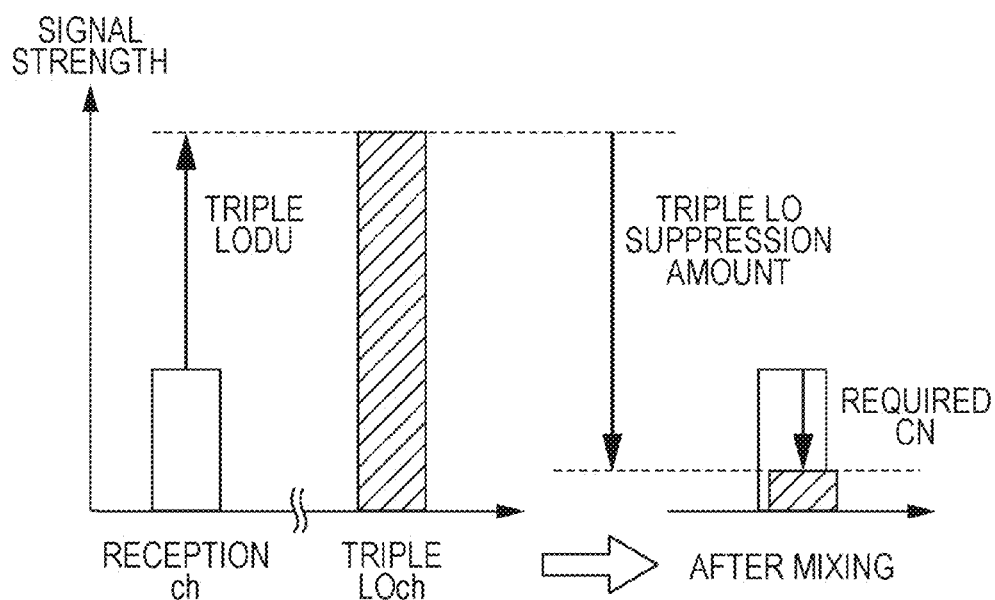
FIG. 10 is a schematic drawing that shows another example of the control of the image cancelling circuit.

Furthermore, FIG. 10 shows processes that cut down on the consumption current in triple local interference using a method that is similar to the image interference characteristics that are shown in FIG. 9. Local interference is interference in which a mixing component of high order components and interference frequency components that are included in the local oscillation frequencies during mixing becomes a frequency that is close to the received ch after mixing. This interference is not limited to triple interference only, but in this instance, triple interference is set as a concrete example.

In the same manner as image interference, it is possible to discern a triple local DU ratio, which is a difference between a triple local interference component and the received ch. As shown in Table 7, in a case in which this DU ratio is more lenient than −36 dB, it is possible to set a triple local cancelling circuit to not operate, and therefore, it is possible to cut down on consumption current by 35 mA as a result.

TABLE 7

| | | Triple LO Cancelling Circuit | | |
|---|---|---|---|---|
| | Reception System | In Operation | Not In Operation | Unit |
| Triple LO Suppression Amount | DVB-T2 8 MHz | 70 | 55 | dB |
| Allowable Triple LO DU | (Required CN 19 dB) | −51 | −36 | dB |
| Consumption Current | — | 260 | 225 | mA |

4. Fourth Embodiment

Figure 11:
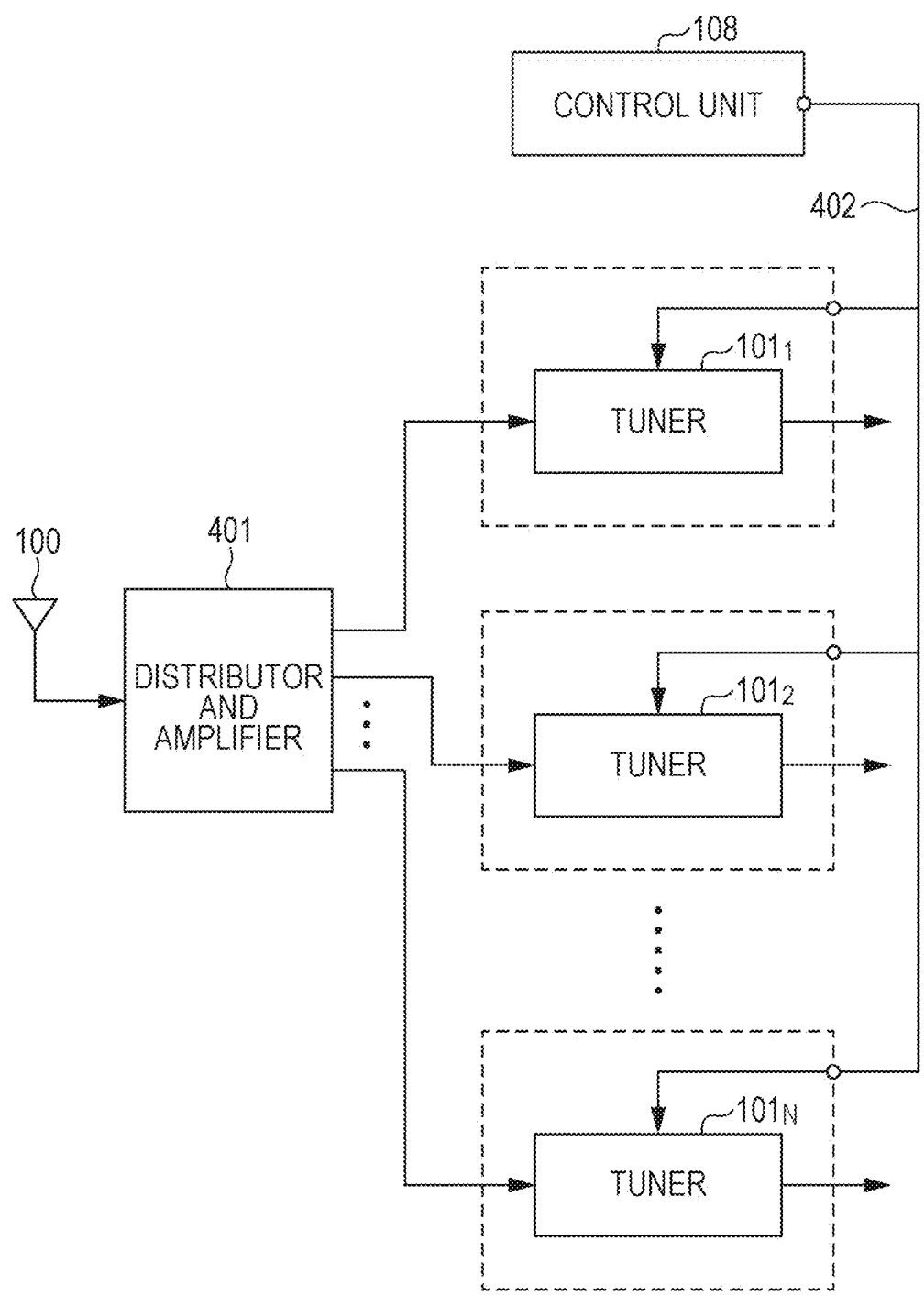
FIG. 11 is a block diagram that is used in the description of a multi-tuner system in a fourth embodiment of the present disclosure.

In a fourth embodiment, the present disclosure is applied to a receiving apparatus that is provided with a plurality of tuners. This kind of system that is provided with a plurality of tuners is referred to as a multi-tuner system. As shown in FIG. 11, a multi-tuner system is provided with a plurality of tuners $101_1$ to $101_N$. The output of the antenna 100 is supplied to a distributor and an amplifier 401 and, is distributed to N outputs, and each output is respectively input to the tuners $101_1$ to $101_N$.

The tuner $101_1$ is a tuner that is used in primary applications such as viewing and recording, and the other tuners $101_2$ to $101_N$ are tuners for simultaneous recording (or simultaneous viewing). Each tuner has the same configuration as the tuner 101 that is shown in FIG. 1. A superordinate control unit 108 is provided in order to control the plurality of tuners $101_1$ to $101_N$. The control unit 108 and each tuner are connected via a bus 402. The control unit 108 controls each tuner by performing communication with the control circuit 110 of each tuner.

Additionally, there are circumstances in which each tuner has an individual IC, and those in which all of the tuners are included in a single IC. In addition, the distributor and the amplifier 401 may be set so as to be included in the same IC as the tuner with the highest number.

In this kind of multi-tuner system, for example, there are cases in which the tuner $101_1$ is used in primary applications such as viewing and recording, while at least one of the tuners $101_2$ to $101_N$ is not used in primary applications such as viewing and recording. The tuners $101_2$ to $101_N$ which are not used in primary applications detect the levels of interference wave signals other than television airwaves such as FM airwaves and mobile wireless waves by scanning frequency bands other than those of television airwaves, or by residing in the frequency bands in either an independent or a shared manner. Further, a detection result is stored in a channel list, levels of interference are recognized, and therefore, it is possible to set optimal settings for a reception tuner on the basis of a reception environment. For example, by scanning frequency bands of an interference source in a mobile wireless wave band, or continuing reception or intermittently receiving with surplus tuners, the levels of an interference source are observed, and optimal settings are set for a reception tuner, and therefore, it is also possible to secure reception performance even in reception environments in which interference conditions and the like ordinarily change.

Furthermore, in a multi-tuner system of the related art, it is normal to split an antenna output by using an ordinary two-branched distributor with 1 input and 2 outputs. For example, an RF input from the antenna is input into a first two-branched distributor, two outputs of the first two-branched distributor are respectively input into second two-branched distributors, two tuners are connected to the second two-branched distributors, and a third tuner is connected to the first two-branched distributor. In this configuration, since it is necessary to align the NF (a noise factor) of a single tuner, there is a problem in that the same loss as a four-branched distributor is generated. Furthermore, in a two-branched distributor in which a plurality of tuners are connected, mutual interference between the tuners themselves becomes a problem, and therefore, isolation of two-branched distributors can also be included as an example of an important characteristic.

Figure 12:
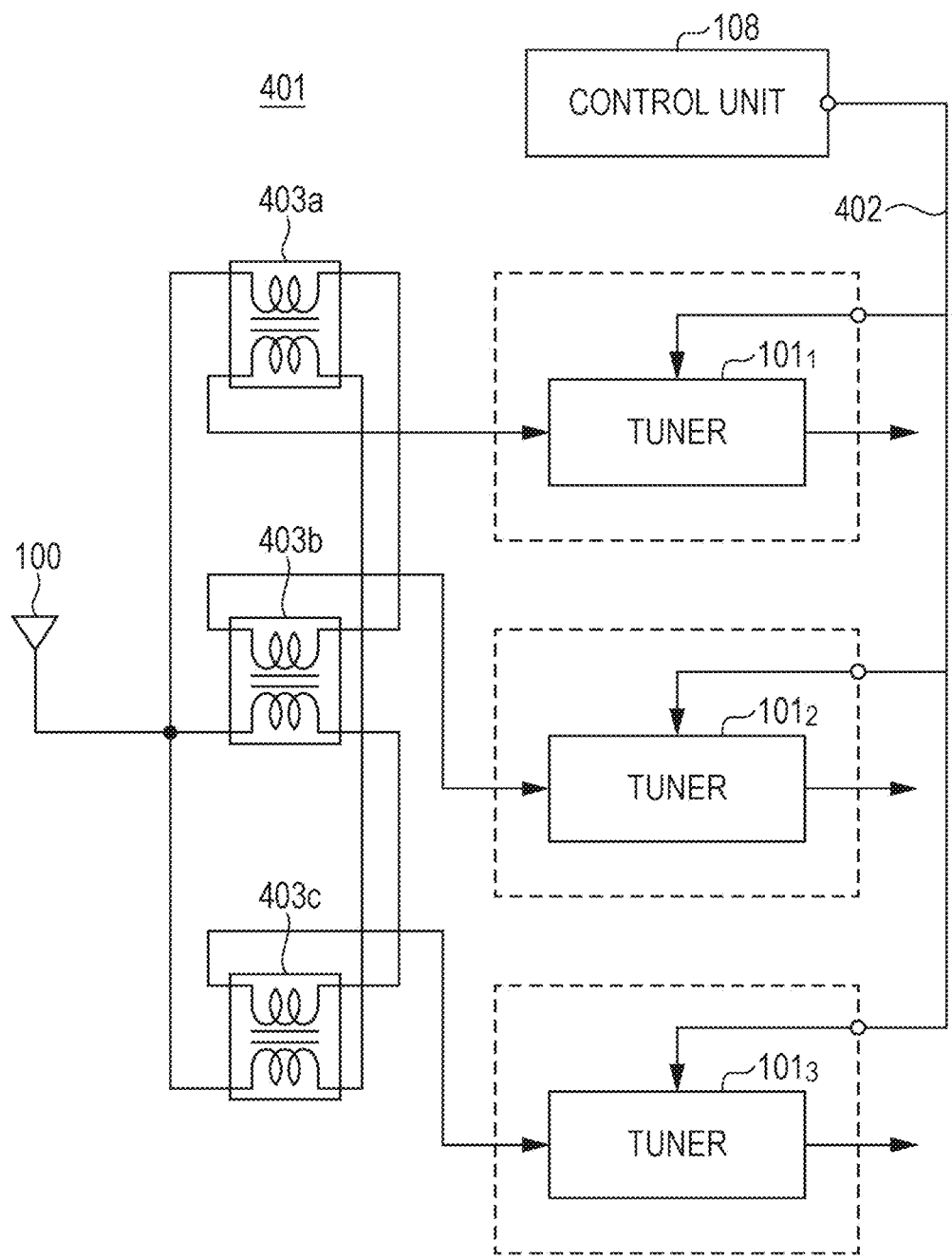
FIG. 12 is a block diagram that shows a configuration of an example of a distributor in the multi-tuner system.

In the multi-tuner system of the present disclosure, as shown in FIG. 12, an RF input from the antenna 100 is supplied to a distributor 401 that is formed from common mode choke coils 403a, 403b and 403c. The common mode choke coils 403a, 403b and 403c discriminate between conduction modes (a common mode and a differential mode). The common mode choke coils 403a, 403b and 403c are set to have a configuration in which two conductive wires are wound around a single core, and have four terminals.

As shown in FIG. 12, by connecting the three common mode choke coils 403a, 403b and 403c, it is possible to configure a distributor 401 that has three outputs. The tuners $101_1$ to $101_3$ are respectively connected to each output. That is, a signal that is branched from the antenna 100 is respectively input to the common mode choke coils 403a, 403b and 403c, signals that have passed through the coils are respectively input into a coil different from a signal input side of a different common mode choke coil, and are respectively input into the tuners $101_1$, $101_2$ and $101_3$ after passing through the coils.

Figure 13:
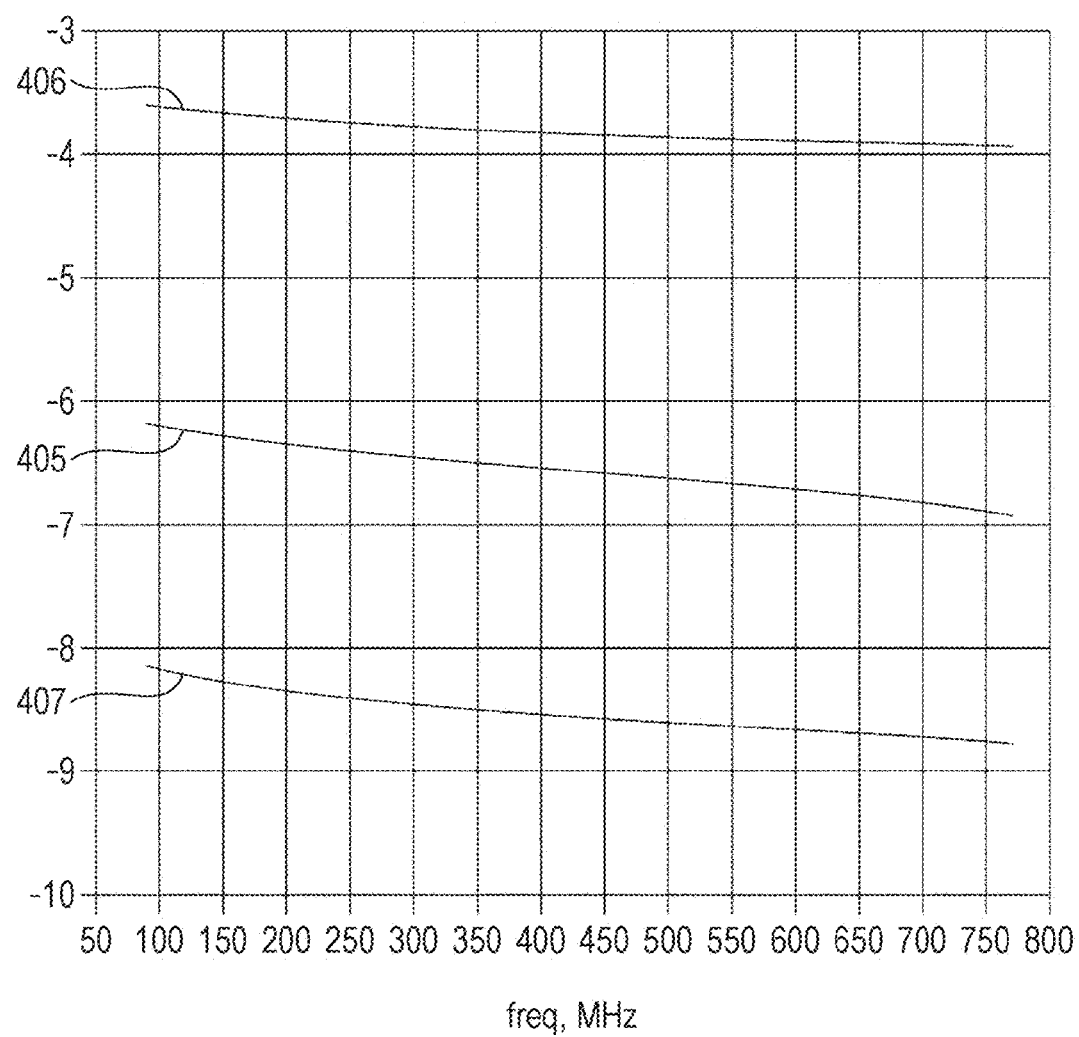
FIG. 13 is a graph that shows pass characteristics of the distributor.

FIG. 13 shows pass characteristics of the distributor 401 that uses the three common mode choke coils 403a, 403b and 403c shown in FIG. 12. In FIG. 13, a pass characteristic 405 shows a pass characteristic that can be obtained by the abovementioned distributor 401, a pass characteristic 406 is a pass characteristic of a two-branched distributor of the related art, a pass characteristic 407 is a pass characteristic of a three-branched distributor of the related art. Furthermore, the isolation characteristics are substantially the same as those of a distributor of the related art. In this manner, by setting the circuit configuration of FIG. 12, an equally branched three-branched distributor is realized, and therefore, it is possible to set reception sensitivity characteristics and interference characteristics to be favorable.

Figure 14:
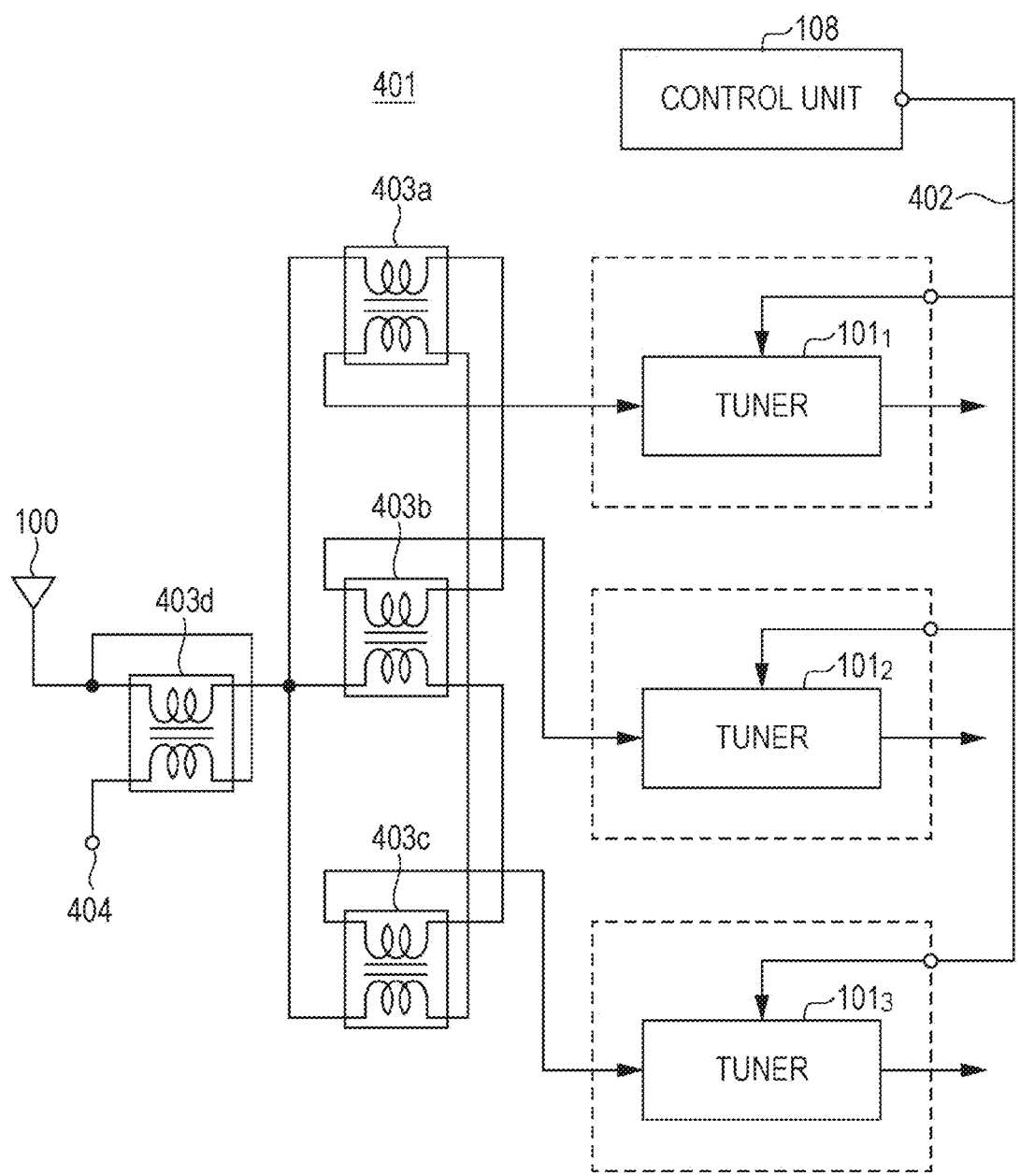
FIG. 14 is a block diagram that shows a configuration of another example of a distributor in the multi-tuner system.

FIG. 14 shows a configuration of a modification example of FIG. 12 that is provided with an RF output terminal 404. It is possible to connect other equipment such as a recorder to the RF output terminal 404. A signal that is input from the antenna 100 is distributed to the RF output terminal 404 and a tuner side by passing through a common mode choke coil 403d. A signal that is distributed to the tuner side is input to the common mode choke coils 403a, 403b and 403c. The common mode choke coils 403a, 403b and 403c are set to have the same connection configuration as that of FIG. 12. By distributing an RF input to the RF output terminal 404 and the tuner side initially, isolation characteristics of the RF output terminal 404 and the tuner side are made favorable, and therefore, it is possible to suppress the effect caused by reductions in interference and changes in impedance that are generated on the tuner side have on the RF output terminal 404.

5. Fifth Embodiment

In the abovementioned multi-tuner system, a fifth embodiment is set to be capable of performing a high-speed channel scan. A sixth embodiment that will be described below is also set to be capable of performing a high-speed channel scan.

Figure 15:
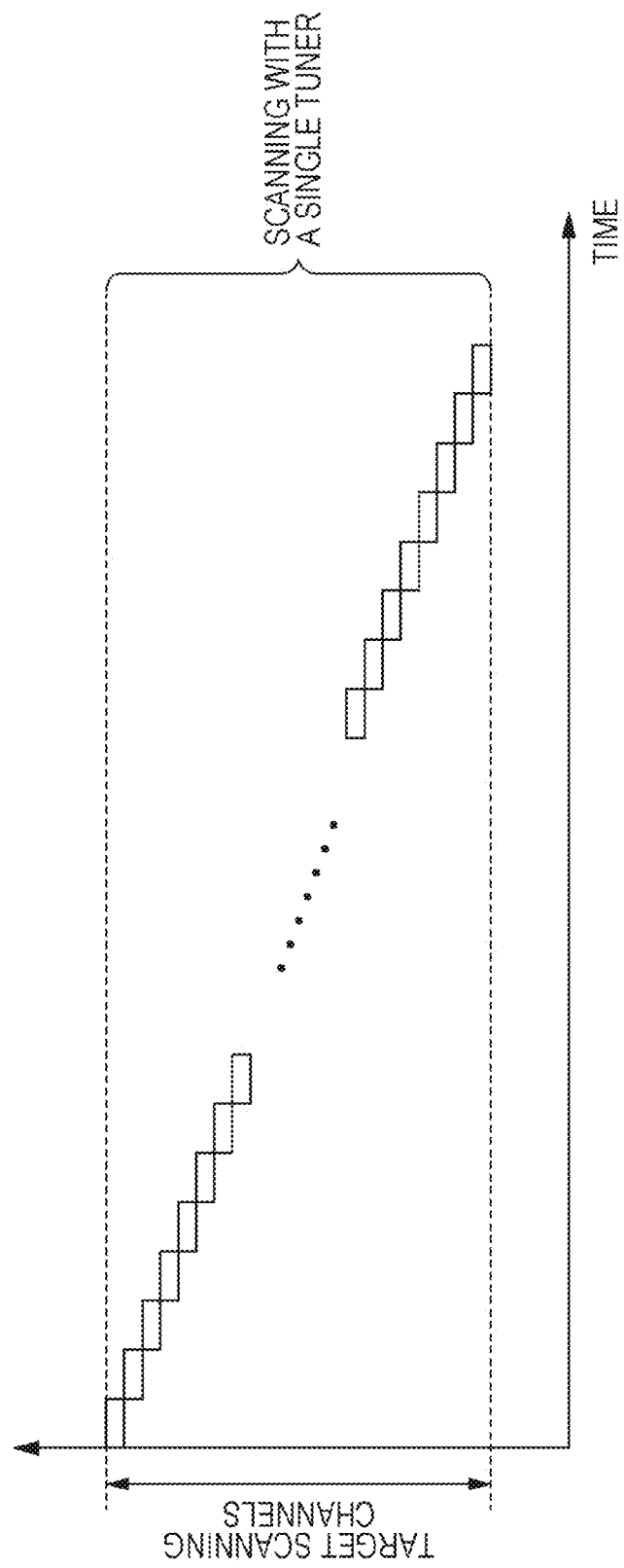
FIG. 15 is a schematic drawing that is used in the description of a multi-scan of a tuner of the related art.

Normally, a channel scan (refer to the flowchart of FIG. 4) for acquiring an effective broadcast channel map is performed when television broadcast receiving equipment is purchased or the like. As shown in FIG. 15, a television receiving apparatus performs a sweep while receiving all channels for which there is a possibility of being actually broadcast (channels that exist at frequencies between a retrieval initiation frequency and a retrieval conclusion frequency) with a single receiver. As a result of this, there is a problem in that the channel scan takes time. In order to solve this kind of problem, a high-speed scanning technique has been suggested.

Figure 16:
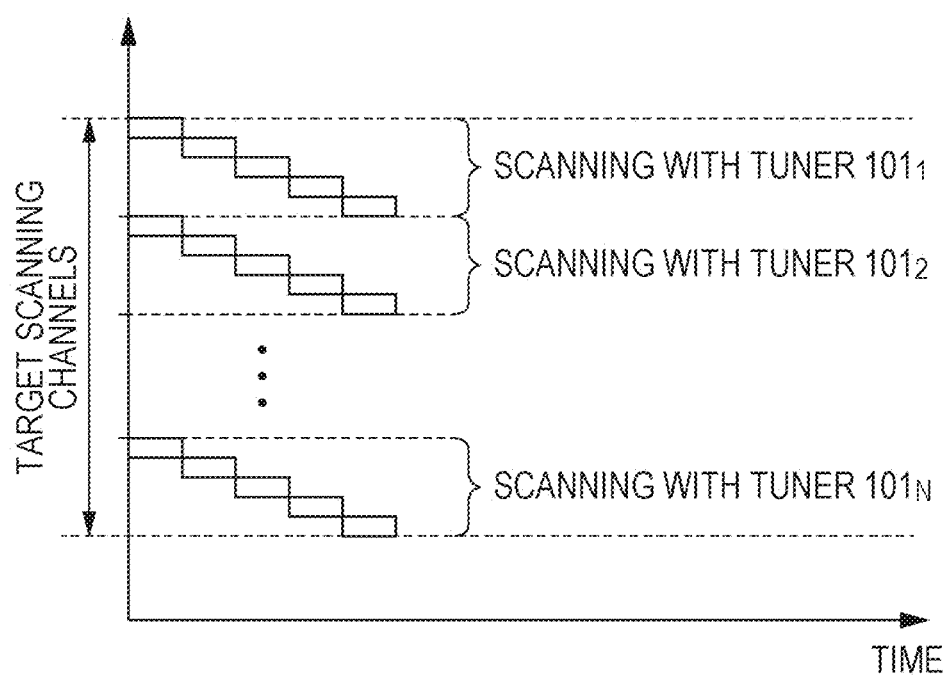
FIG. 16 is a schematic drawing that is used in the description of a fifth embodiment of the present disclosure.

As shown in FIG. 16, in the fifth embodiment, in a channel scan, N tuners respectively scan a channel range that should be scanned (target scanning channels) simultaneously in a shared manner. Since a single tuner may scan 1/N channels of the target scanning channels only, it is possible to reduce a channel scan time. A frequency range or the like that each tuner is responsible for is controlled by the control unit 108.

6. Sixth Embodiment

A channel scanning operation is formed from a signal detection stage that detects the presence or absence of a signal, a synchronized determination stage that determines whether or not signals that are detected to be present are television signals, and furthermore, an information acquisition stage that decodes images and sounds. The sixth embodiment individually sets tuners that perform processes of the signal detection stage (hereinafter, referred to as tuners of a first group), and tuners that perform processes of the synchronized determination stage and information acquisition stage (hereinafter, referred to as a tuners of a second group). Tuners of each group may be a number greater than or equal to one. However, in the same manner as the fifth embodiment that is mentioned above, a plurality of tuners of each group may cooperatively scan a channel range that should be scanned (target scanning channels) simultaneously in a shared manner. The process of each tuner and the processing of information that is acquired by each tuner are controlled by the control unit 108.

Figure 17:
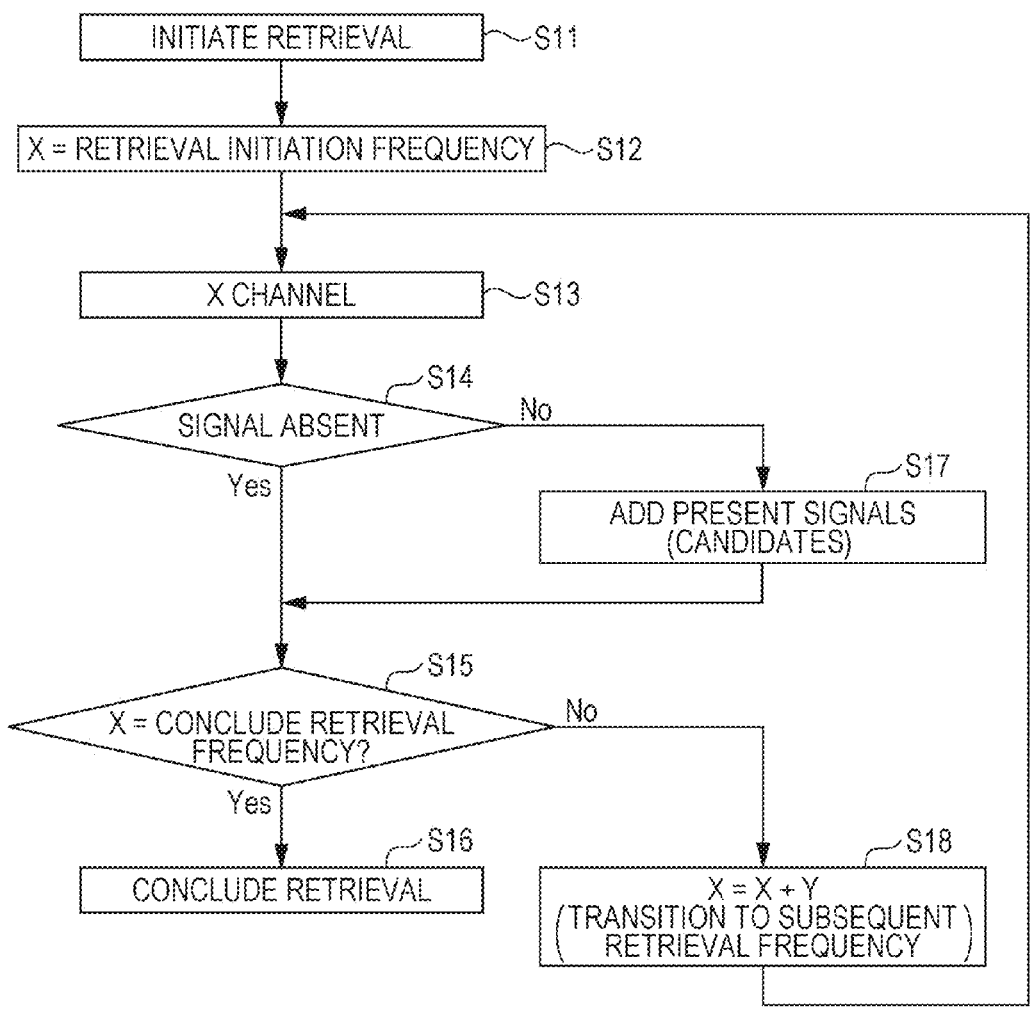
FIG. 17 is a flowchart that is used in the description of a sixth embodiment of the present disclosure.
Figure 18:
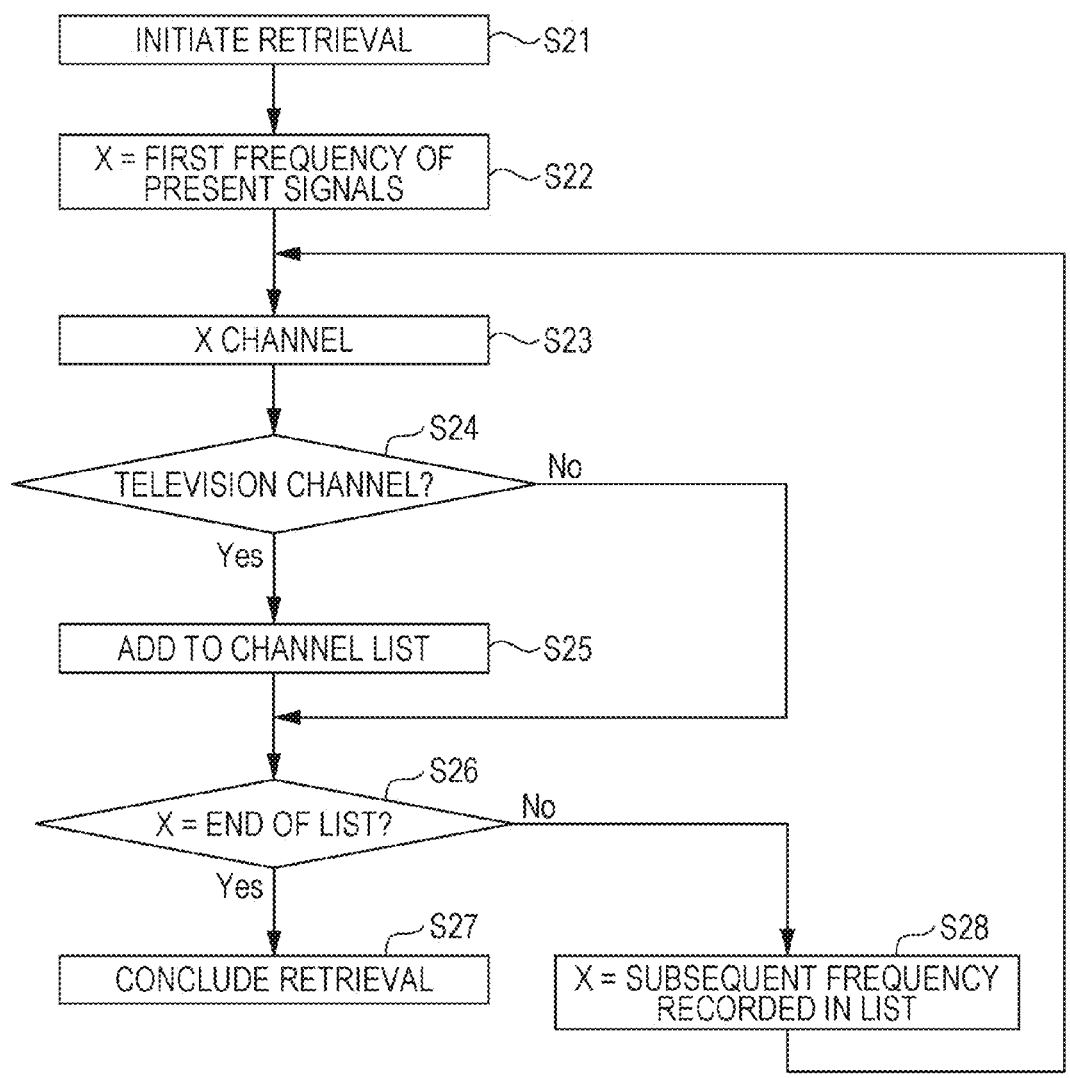
FIG. 18 is a flowchart that is used in the description of the sixth embodiment of the present disclosure.

Tuners of the first group perform the processes of the signal detection stage in the manner that is shown in FIG. 17, and create a present signal list. Tuners of the second group perform the processes of the synchronized determination stage and the information acquisition stage in the manner that is shown in FIG. 18, and create an ultimate channel list. In this manner, by sharing the processes, it is possible to reduce the time that is required by a channel scan. Additionally, from a viewpoint of an increase in speed, it is preferable that processes be performed in parallel by the tuners of the second group initiating the processes thereof before the tuners of the first group complete the processes thereof.

Figure 4:
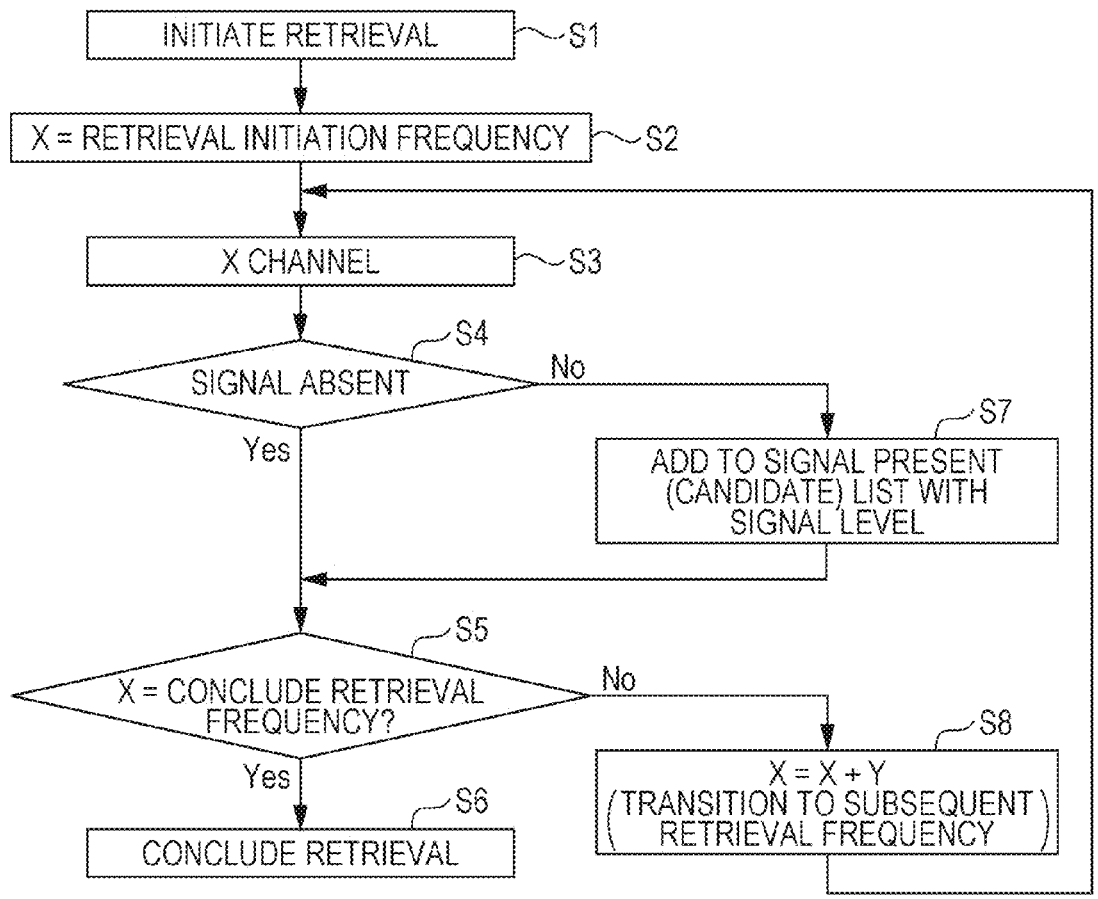
FIG. 4 is a flowchart that shows a flow of processes of a channel scanning operation of a second embodiment of the present disclosure.

The flowchart of FIG. 17 is similar to that of FIG. 4 that is mentioned above.

In Step S11, retrieval is initiated.

Step S12: A retrieval initiation frequency is set to X.

Step S13: A frequency X is selected as a channel.

Step S14: It is determined whether or not a signal is absent.

Step S15: In a case in which the determination result of Step S14 is that a signal is absent, it is determined whether or not the frequency X is a retrieval conclusion frequency.

Step S16: Retrieval is concluded in a case in which the determination result of Step S15 is affirmation.

Step S17: In a case in which the determination result of Step S14 is negation, that is, a signal is present, the corresponding frequency (channel) is added to a present signal (candidate) list. Further, the process proceeds to Step S15. In the abovementioned manner, it is determined whether or not the frequency X is a retrieval conclusion frequency.

Step S18: In a case in which the determination result of Step S15 is negation, that is, a case in which it is determined that the frequency X is not a retrieval conclusion frequency, a frequency (X+Y) of a subsequent channel in which a predetermined frequency Y has been added to the frequency X, is set as a subsequent retrieval target frequency.

As a result of processes of the abovementioned channel detection of the tuners of the first group, the present signal list is created. The tuners of the second group perform synchronized determination and information acquisition only for frequencies (channels) of present signals that are listed in the present signal list, and ultimately determine whether or not the frequencies are frequencies on which television signals exist.

FIG. 18 shows a flow of processes that the tuners of the second group perform.

In Step S21, retrieval is initiated.

Step S22: A first frequency X in the present signal list is set as a retrieval initiation frequency.

Step S23: The frequency X is selected as a channel.

Step S24: A synchronized determination process and an information acquisition process are performed for the frequency X, and it is determined whether or not the frequency X is a television channel. If the synchronized determination process and the information acquisition process are successful, it is determined that the frequency X is a frequency (television channel) for which there is currently a television broadcast.

Step S25: In a case in which the determination result of Step S24 is affirmation, the frequency X is added to a channel list.

Step S26: After Step S25 has been concluded or the determination of Step S24 has been concluded, it is determined whether or not the frequency X is the final frequency of the list.

Step S27: Retrieval is concluded in a case in which the determination result of Step S26 is affirmation.

Step S28: In a case in which the determination result of Step S26 is negation, that is, a case in which it is determined that the frequency X is not the final frequency of the list, a subsequent frequency that appears in the list is set as the frequency X. Further, the process returns to Step S23.

7. Seventh Embodiment

A seventh embodiment reduces a concern of the information of channels being lost during the channel scan. FIG. 19 is a drawing for describing a circumstance in which the information of channels is lost. FIG. 19A shows channels that are target of a channel scan, among which channels that are shown with a broken line mark are channels for which there is no signal, and channels that are shown by a solid line mark are channels that have signals.

However, even though a channel R is a channel that has a signal, the signal strength thereof is weak, and therefore, high NF characteristics (meaning high sensitivity characteristics) are required in order to receive the channel R. Furthermore, even though a channel Q is a channel that has a signal, an electric field of an adjacent channel is strong, and therefore, high distortion characteristics are required in order to receive the channel. In a case of a receiving apparatus of the related art, as shown in FIG. 19B, since it is normal for the characteristics of each tuner of a multi-tuner system to be set to be substantially uniform, it was not possible to acquire the channels R and Q using a channel scan.

The seventh embodiment is set so as to solve this problem. In the multi-tuner system, the seventh embodiment is set so that the characteristics of the plurality of tuners differ. That is, in the abovementioned example, the seventh embodiment is provided with both a tuner that is set so as to have high NF characteristics, and a tuner that is set so as to have high distortion characteristics. Normally, it is difficult to satisfy these two characteristics using a single tuner.

Figure 20:
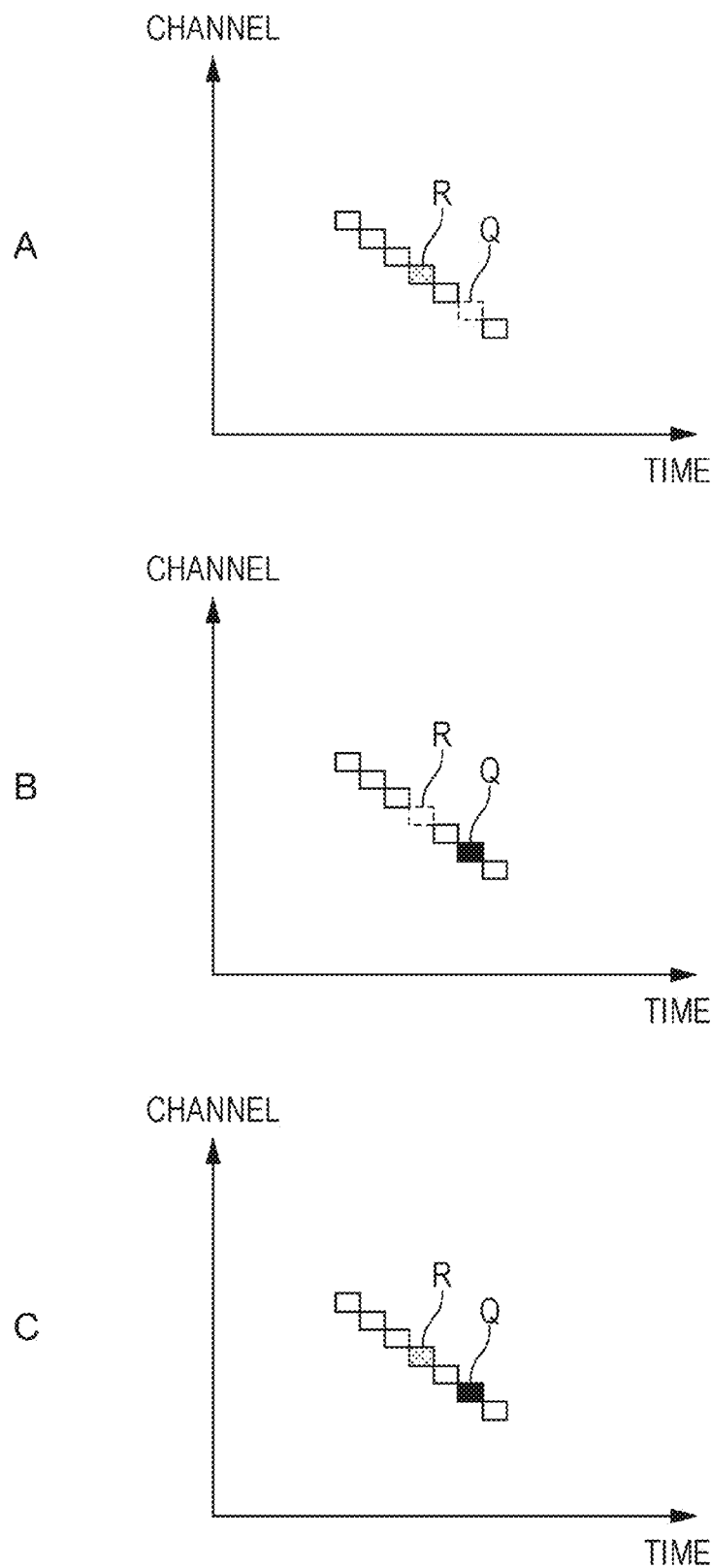
FIGS. 20A, 20B and 20C are schematic drawings that are used in the description of the seventh embodiment of the present disclosure.

In a case of a tuner that is provided with high NF characteristics in the case that is shown in FIG. 19A, as shown in FIG. 20A, it is possible to acquire a channel list that includes the channel R using the channel scan. Meanwhile, in a case of a tuner that is provided with high distortion characteristics, as shown in FIG. 20B, it is possible to acquire a channel list that includes the channel Q using the channel scan. Therefore, as shown in FIG. 20C, through combined use of channel lists that are respectively acquired by tuners for which these differing characteristics are set, it is possible to acquire a channel list that includes the channels R and Q.

Figure 21:
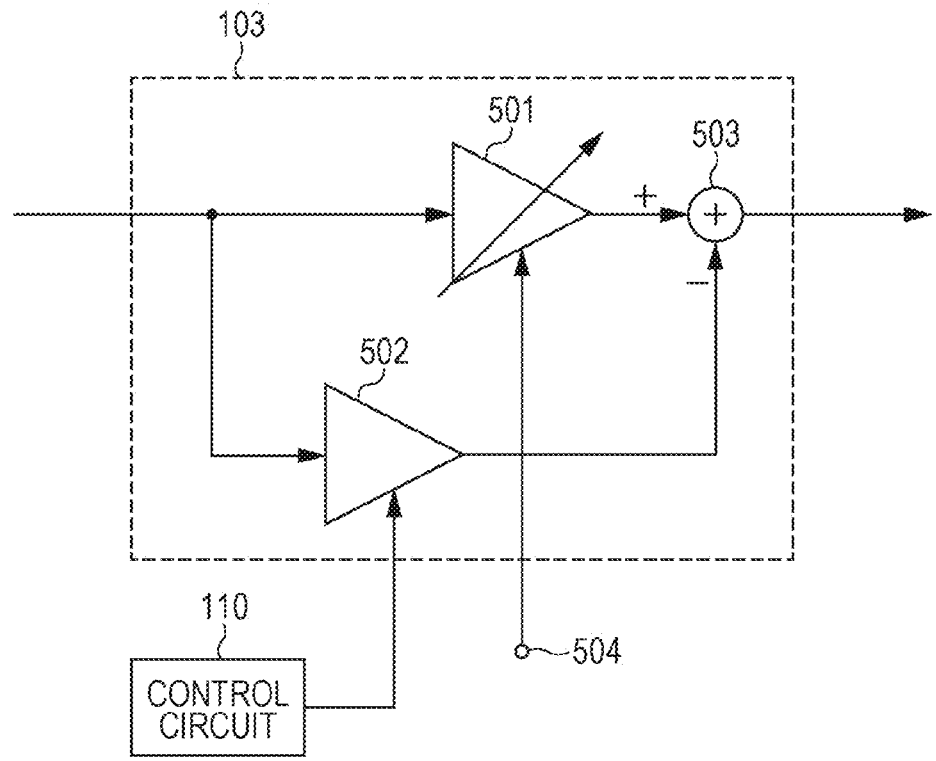
FIG. 21 is a block diagram that shows an example of a configuration of tuner in the seventh embodiment of the present disclosure.

A concrete configuration example of tuners with differing characteristics will be described. FIG. 21 is an example of a configuration of a high-frequency wave amplification circuit of the tuner 101 (refer to FIG. 1). The high-frequency wave amplification circuit 103 includes a high-frequency wave amplifier 501 that takes on the primary amplification function, and a distortion generation circuit 502 that is connected to the high-frequency wave amplifier 501 in parallel. Distortion components from the distortion generation circuit 502 are mixed after being inverted by a mixer 503. An AGC signal is supplied to the high-frequency wave amplifier 501 as a gain control signal from a terminal 504, and the gain of the high-frequency wave amplifier 501 is controlled in response to the AGC signal.

The distortion generation circuit 502 is set at a different operating point from the high-frequency wave amplifier 501, and while the gain of a received signal is suppressed, distortion components are generated. For example, in V-I characteristics of the amplifier, if the operating point is set to be low, distortion components are generated, and if the operating point is set to be high, the gain of the received signal is high. The operating point of the distortion generation circuit 502 is controlled by the control circuit 110, and therefore, the amount of distortion components that are generated is controlled. The configuration that is shown in FIG. 21 is a circuit that can cancel distortion components that are generated by the high-frequency wave amplifier 501, and therefore, is a distortion cancelling circuit.

If relatively more distortion components are generated by the control circuit 110, a larger distortion cancellation amount is obtained, but at the same time, the received signal is also cancelled, and therefore, side effects such as reductions in gain and the deterioration of a noise factor are generated. By controlling the amount of distortion components using the control circuit 110, it is possible to obtain a distortion specialization setting and a noise factor specialization setting.

Figure 22:
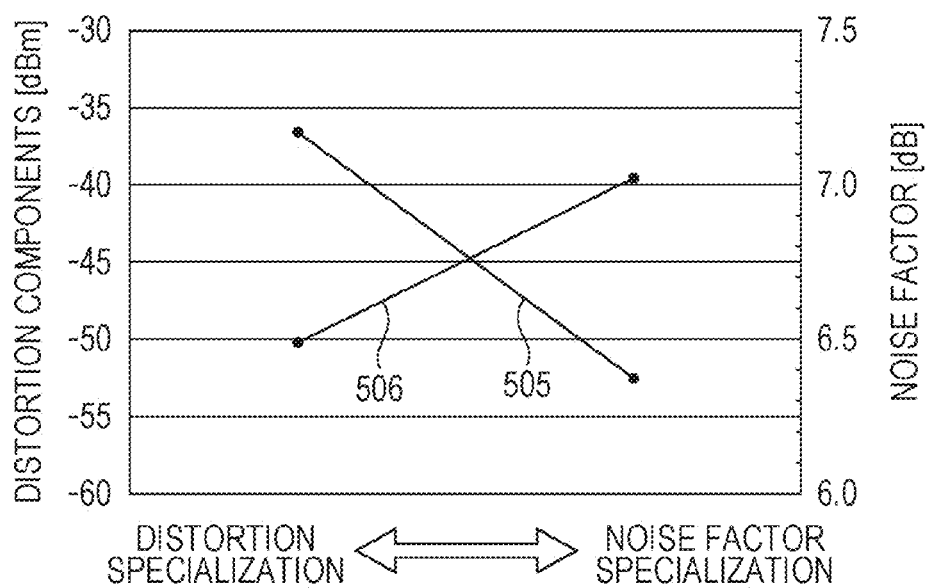
FIG. 22 is a schematic drawing that is used in the description of the characteristics of a tuner.

An example of characteristics in a given tuner is shown in FIG. 22. In FIG. 22, the horizontal axis is a suppression amount due to the control circuit 110, and the vertical axes respectively show NF (noise factor) and distortion components. NF and distortion components are generally more favorable the smaller they are. However, as shown in the NF characteristics 505 and the distortion characteristics 506, the two characteristics perform contradictory changes. As a result of the control of the control circuit 110, it is possible to realize either an NF specialization tuner in which characteristics that improve NF are emphasized, or a distortion specialization tuner in which characteristics that improve distortion are emphasized. Therefore, it is possible to prevent a circumstance in which the information of received channels is lost using both the distortion specialization setting tuner and the noise factor specialization setting tuner depending on a signal environment.

Additionally, by switching the settings of the tuner characteristics, it is possible to prevent a circumstance in which the information of received channels is lost in the same manner as that described above in a system that is provided with a single tuner rather than a multi-tuner system. However, in a case of a multi-tuner system, it is possible to perform the channel scan simultaneously with tuners for which the settings have been made to be different, and therefore, there is an advantage in that an increase in the speed of the channel scan is possible.

8. Eighth Embodiment

The eighth embodiment reduces a selection time by performing simultaneous selection of channels with a plurality of tuners in a multi-tuner system. Following the increases in capacity and increases in the speed of image process of hard disks, receiving recording devices such as hard disk recorders have become capable of being equipped with a plurality of tuners and recording a plurality of programs at the same time as viewing.

Figure 23:
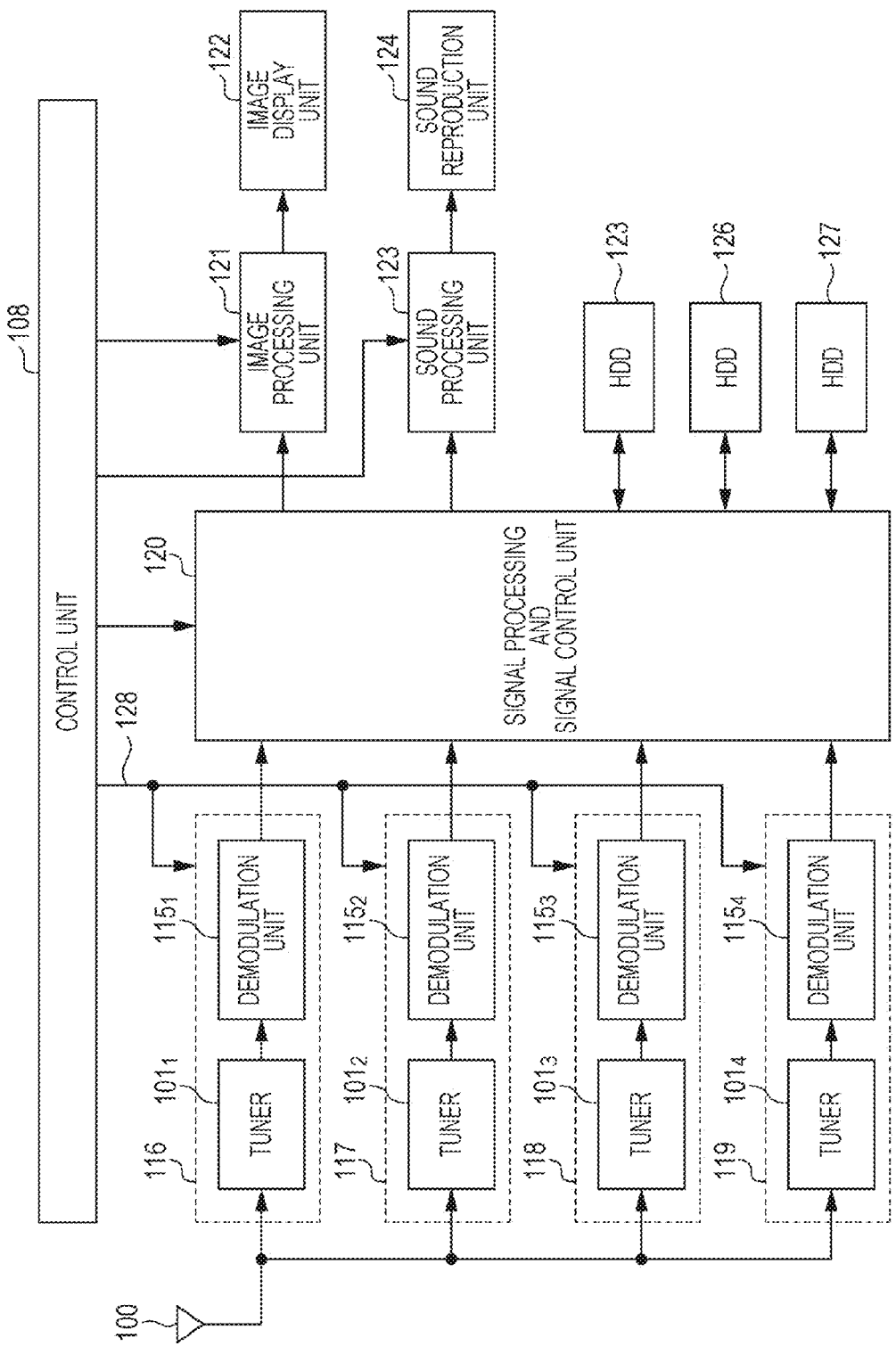
FIG. 23 is a block diagram that shows a configuration of an example of a multichannel simultaneous recording broadcast receiver to which an eighth embodiment of the present disclosure is applied.

FIG. 23 shows a configuration example of a multichannel simultaneous recording broadcast receiver (intended for use in Japan). The broadcast receiver is provided with a tuner module for viewing 116, and tuner modules for normal recording 117, 118 and 119. The tuner modules are connected to the antenna 100. In this instance, as an example for descriptive purposes, it is set so that there are one tuner module for viewing and three tuner modules for normal recording, but these numbers may be set as other numbers.

Each tuner module includes tuners $101_1$ to $101_4$ for receiving terrestrial digital broadcasts that perform down-conversion of received RF (Radio Frequency) signals to intermediate signals of a low frequency, and demodulation units $115_1$ to $115_4$ of the ISDB-T method that demodulate the down-converted signals, and create a TS (Transport Stream).

TS data that is output from the tuner module for viewing 116 is input into a signal processing and signal control unit 120, a predetermined digital signal process is carried out thereon, converted image data is output to an image processing unit 121, and sound data is output to a sound processing unit 123. In the image processing unit 121, processes for display on an image display unit 122 are carried out, and an image is reproduced by being sent to the image display unit 122. In the sound processing unit 123, conversion to a sound signal that is capable of being reproduced by a sound reproduction unit 124 is performed, and sound is reproduced by the sound reproduction unit 124.

TS data that is created by the tuner module for normal recording 117 is input into the signal processing and signal control unit 120, a predetermined digital signal process is carried out thereon, and is accommodated on one of a hard disk (hereinafter, referred to as a HDD) 125, a HDD 126 and a HDD 127. In the same manner, TS data of the tuner module for normal recording 118 and the tuner module for normal recording 119 is accommodated on one of the HDD 125, the HDD 126 and the HDD 127. Additionally, the number of HDDs is not limited to three.

Data that is accommodated on the HDD 125, the HDD 126 or the HDD 127 is read by the signal processing and signal control unit according to necessity, and image data and sound data on which signal processes have been carried out are output to the image processing unit 121 and the sound processing unit 123. Processes for display on the image display unit 122 are carried out on the image data, and the image data is reproduced by the image display unit 122. In the sound processing unit 123, the sound data is converted to a sound signal that is capable of being reproduced by the sound reproduction unit 124, and sound is reproduced by the sound reproduction unit 124. As a result of this, the reproduction of data that is accommodated on the HDD 125, the HDD 126 or the HDD 127 is also possible.

Control inside the broadcast receiver is performed by the control unit 108. The control unit 108 performs overall control and monitoring of the tuner module for viewing 116, the tuner modules for normal recording 117, 118 and 119, the signal processing and signal control unit 120, the image processing unit 121, the sound processing unit 123 and the like, and is generally configured by a CPU, RAM, ROM and the like.

Figure 24:
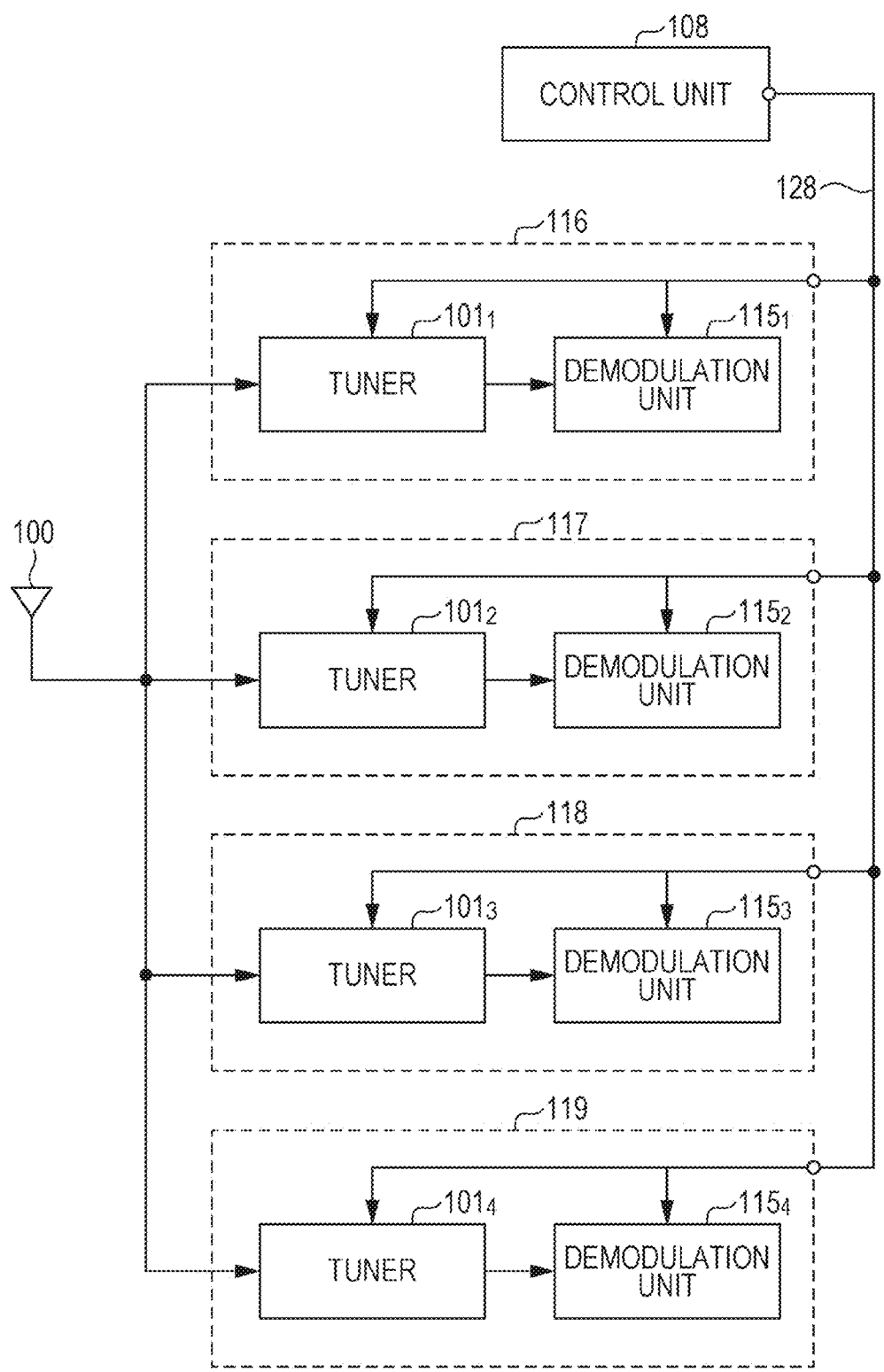
FIG. 24 is a block diagram that shows a configuration of a tuner control unit.

FIG. 24 shows details of a tuner control unit of the broadcast receiver that is shown in FIG. 23. In this instance, the control unit 108 and the tuner module for viewing 116 and tuner modules for normal recording 117, 118 and 119 are connected to a single control line 128. However, in this instance, a single control line is described for purposes of description but may be a different number. Inside each tuner module, the tuners $101_1$ to $101_4$ and the demodulation units $115_1$ to $115_4$ are separately connected.

As a control method, if a time of the start-up of broadcast reception or an operation during channel selection are considered, for example, control is performed in an order of tuner $101_1$→demodulation unit $115_1$→tuner $101_2$→demodulation unit $115_2$→tuner $101_3$→demodulation unit $115_3$→tuner $101_4$→demodulation unit $115_4$. In this control method, there is a problem in that the time taken until the completion of channel selection is increased in proportion with the number of tuners. The eighth embodiment reduces the control time of all tuners by positioning a tuner module for normal recording with a dedicated tuner for a single program.

Figure 25:
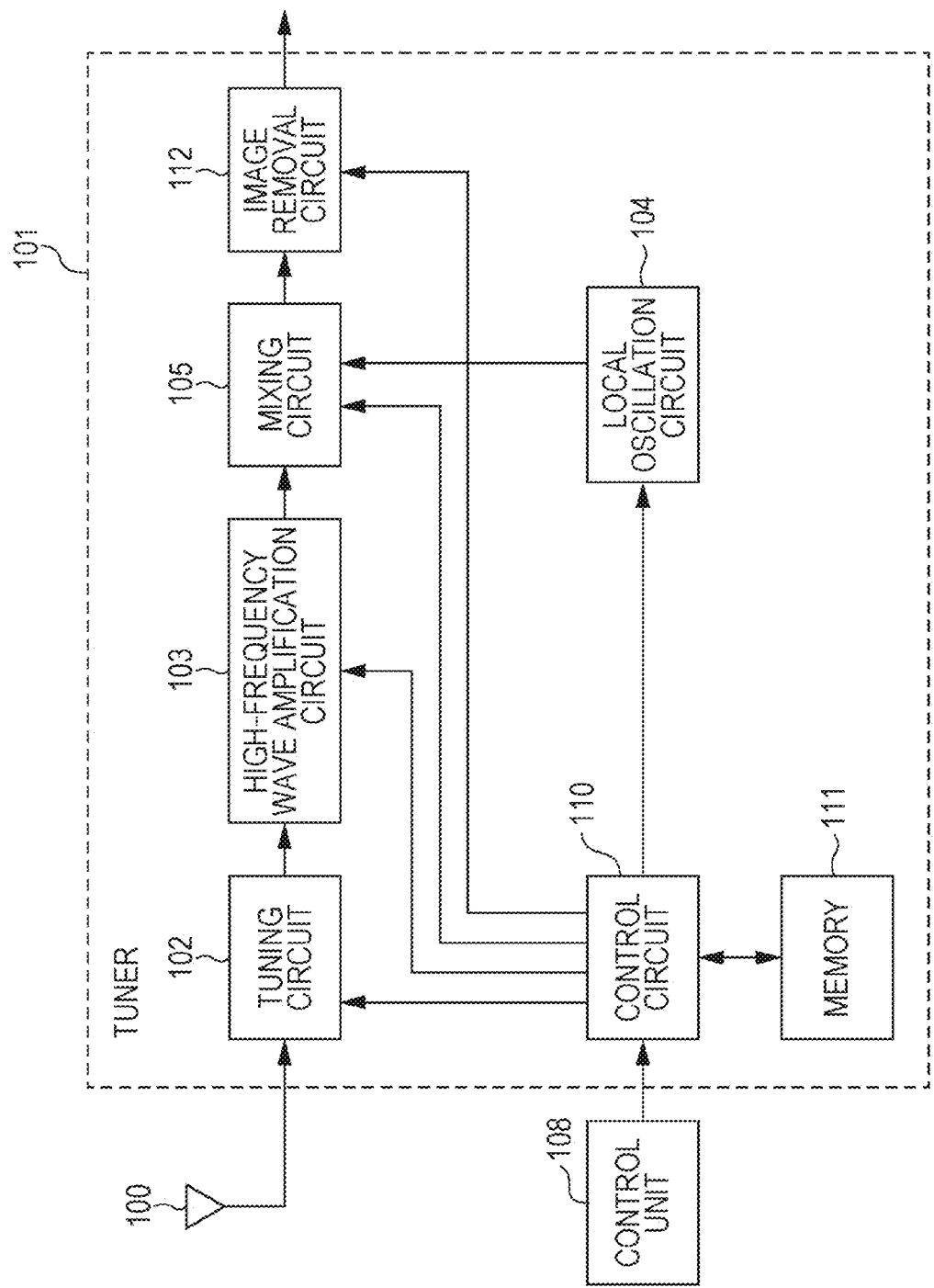
FIG. 25 is a block diagram of an internal configuration example of a tuner.

FIG. 25 shows an internal configuration example of a tuner. The tuner 101 includes the tuned circuit 102, the high-frequency wave amplification circuit 103, the mixing circuit 105, an image removal circuit 112, the control circuit 110, the local oscillation circuit 104 and the memory 111. The antenna 100 for receiving RF signals is connected to the tuned circuit 102. The control unit 108 for performing control from the outside is connected to the control circuit 110 using a control line.

The tuned circuit 102 is provided with a band limitation filter, and among RF signals that are supplied from the antenna 100, the levels of signals outside a band of channels desired by a user are reduced by the band limitation filter on the basis of the control of the control circuit 110. The tuned circuit 102 sets selection channels.

The high-frequency wave amplification circuit 103 amplifies an RF signal that is supplied from the tuned circuit 102 and supplies the signal to the mixing circuit 105. The mixing circuit 105 mixes an RF signal that is supplied from the high-frequency wave amplification circuit 10 and a local oscillation signal from the local oscillation circuit 104, creates an intermediate signal with an intermediate frequency, and the intermediate frequency is supplied to the image removal circuit 112. The image removal circuit 112 is provided with an image removal filter that performs a cancelling process by reversing the phases of amplitude and phase in order to attenuate or remove signals in the intermediate signal that is supplied from the mixing circuit 105, which become image interference.

The control circuit 110 controls the tuned circuit 102 depending on a channel selection operation of the control unit 108. Furthermore, the control circuit 110 supplies a predetermined setting value to the image removal circuit 112 in order for the image removal circuit 112 to attenuate or remove signals in the intermediate signal that is supplied from the mixing circuit 105, which become image interference.

Furthermore, the control circuit 110 controls the local oscillation circuit 104 so that the local oscillation circuit 104 oscillates at a local oscillation frequency for suppressing an effect of received interference that becomes image interference, depending on selection channels. More specifically, a local oscillation frequency, which depends on selection channels, for suppressing the effect of received interference depending on selection channels is set. The control circuit 110 selectively reads the setting value and the setting value is supplied to the local oscillation circuit 104. The local oscillation circuit 104 oscillates a local oscillation signal of a local oscillation frequency, which is a setting value that is supplied from the control circuit 110, and supplies the local oscillation signal to the mixing circuit 105. The memory 111 has a table in which setting values of the local oscillation frequencies that depend on each channel are stored in order for the control circuit 110 to perform a switching control operation of the local oscillation frequencies on the local oscillation circuit 104.

The eighth embodiment of the present disclosure realizes a tuner that is made to be capable of selecting channel without the control of the control unit 108 by storing the necessary channel selection information in order to select an arbitrary channel in the memory 111. The channel selection information is data for controlling the tuned circuit 102, the high-frequency wave amplification circuit 103, the mixing circuit 105, the local oscillation circuit 104 and the image removal circuit 112.

Processes during channel retrieval of the eighth embodiment of the present disclosure for retrieving receivable channels will be described with reference to the flowchart of FIG. 26.

Step S41: The control unit 108 initiates channel retrieval using the tuner of the tuner module for viewing 116.

Step S42: A channel number counter for storing the number of channels that have been found is set to an initial state (0).

Step S43: An initial channel is selected as a channel.

Step S44: A check to see whether or not there is a viewing channel is made.

Step S45: In a case in which the determination result of Step S44 affirmation, that is, a case in which there is a viewing channel, the channel number counter is increased by 1.

Step S46: It is determined whether or not the count value of the channel number counter is less than or equal to the number of tuner modules for normal recording.

Step S47: In a case in which the determination result of Step S46 affirmation, the control unit 108 selects a tuner module for normal recording that depends on the number of channels. For example, in a case in which a first channel is found, the tuner module for normal recording 117 is selected. In a case in which a second channel is found, the tuner module for normal recording 118 is selected. In a case in which a third channel is found, the tuner module for normal recording 119 is selected.

Step S48: Required information in order to select a corresponding channel as a channel is stored in the memory 111 via the control circuit 110 inside the tuner module that was selected by the control unit 108.

Step S49: Subsequent to Step S48, or in a case in which the determination result of Step S46 is negation, viewawble channel information and information of channel allocation for the tuner module for normal recording are respectively registered in the memory (ROM) inside the control unit 108. Further, the control process proceeds to Step S50 (Is there a subsequent channel?).

Step S50: After it is determined that there is not a viewable channel in Step S44, or after Step S49, it is determined whether or not there is a subsequent channel.

Step S51: In a case in which the determination result of Step S50 is affirmation, that is, it is determined that there is a subsequent channel, the subsequent channel is selected as a channel. Further, the control process returns to Step S44 (Is there a viewable channel?).

Step S52: In a case in which the determination result of Step S50 is negation, that is, it is determined that there is not a subsequent channel, the channel retrieval process is concluded.

Additionally, in the abovementioned description, the storage of channel selection information for the tuner module for normal recording is described, and the control of the tuner module for viewing 116 performs setting during channel selection by storing channel selection information that relates to all channels in the memory 111 of the tuner module for viewing 116, or using the control unit 108. Furthermore, the memory 111 inside each tuner module is used, but it may be conditions so that channel selection information is stores in memory that is provided externally for each tuner module.

Figure 26:
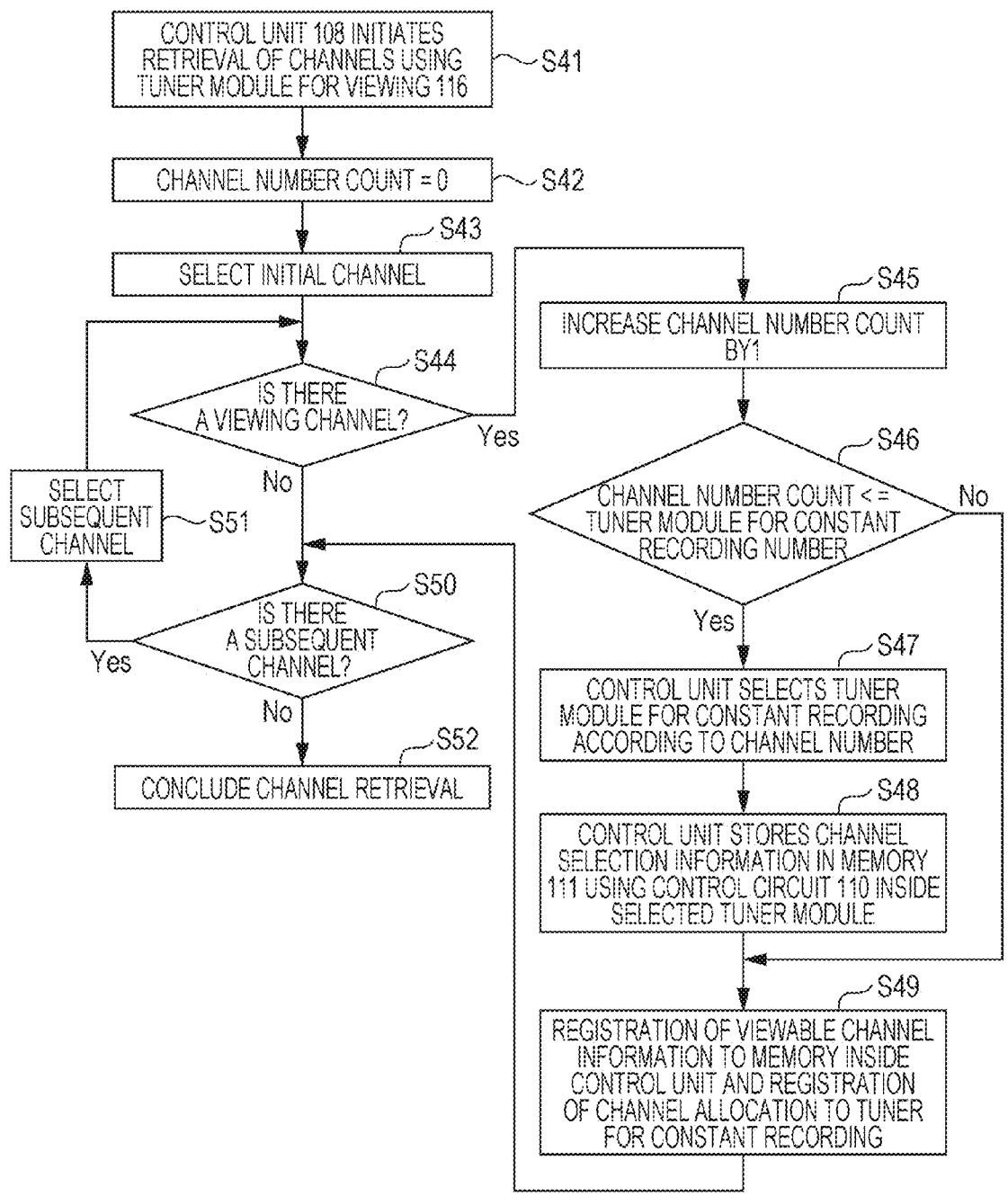
FIG. 26 is a flowchart that shows a flow of processes during channel retrieval of the eighth embodiment of the present disclosure.
Figure 27:
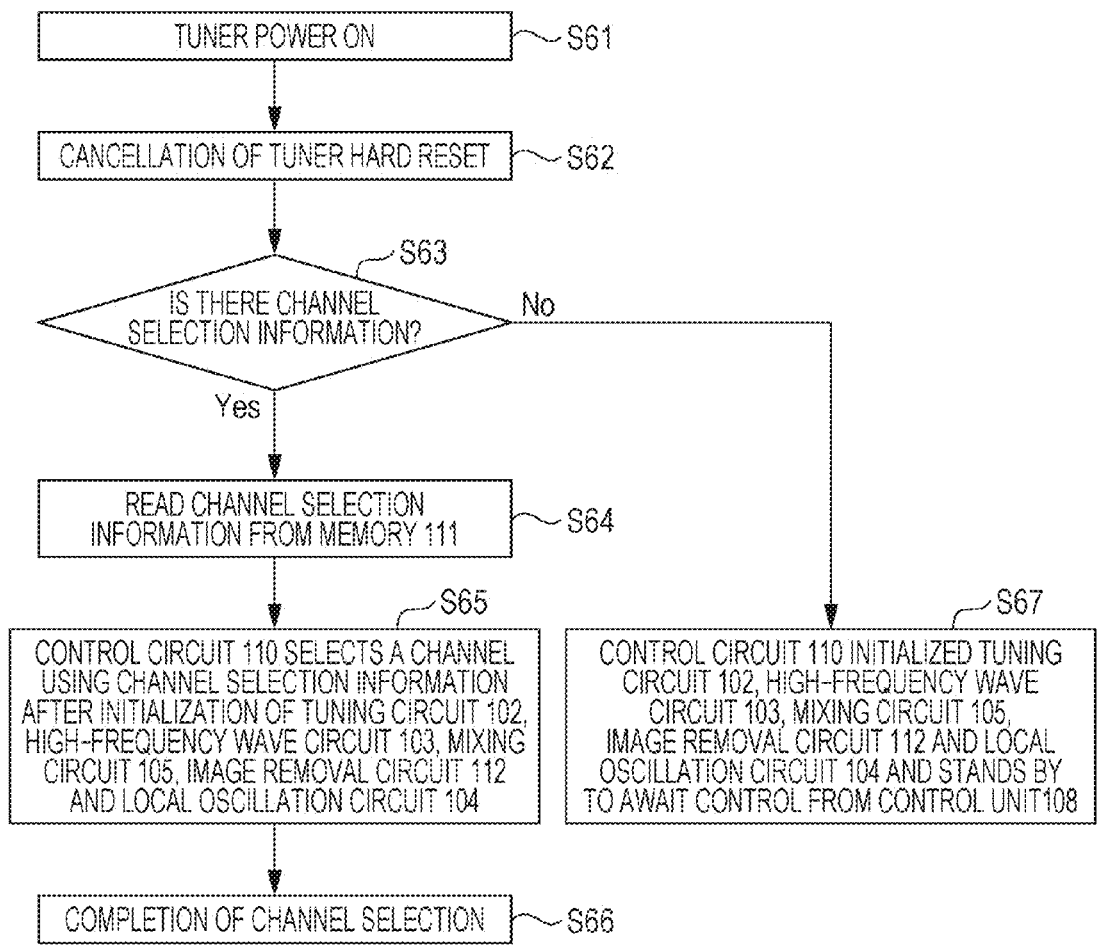
FIG. 27 is a flowchart that shows a flow of processes during channel retrieval of the eighth embodiment of the present disclosure.

The flowchart of FIG. 27 shows processes by which a tuner for normal recording performs automatic channel selection using channel selection information that is saved by the processes of FIG. 26.

Step S61: The power of each tuner for normal recording is turned on.

Step S62: Cancellation of a hard reset of the tuner is performed by the control unit. That is, After the power is turned on, the hardware is reset. The tuner initiates operation by using this as a trigger.

Step S63: It is determined whether or not there is channel selection information.

Step S64: If it is determined in Step S63 that there is channel selection information, the channel selection information is read from the memory 111.

Step S65: The control circuit 110 selects a channel by performing automatic setting using the channel selection information after initialization of the tuned circuit 102, the high-frequency wave amplification circuit 103, the mixing circuit 105, the image removal circuit 112 and the local oscillation circuit 104.

Step S66: Channel selection is completed by the control circuit 110 without control from the control unit 108 being necessary.

Step S67: In a case in which the determination result of Step S63 is negation, that is, it is determined that there is no channel selection information, the control circuit 110 initializes the tuned circuit 102, the high-frequency wave amplification circuit 103, the mixing circuit 105, the image removal circuit 112 and the local oscillation circuit 104. Further, the control circuit 110 enters a standby state of waiting for control from the control unit 108.

Figure 28:
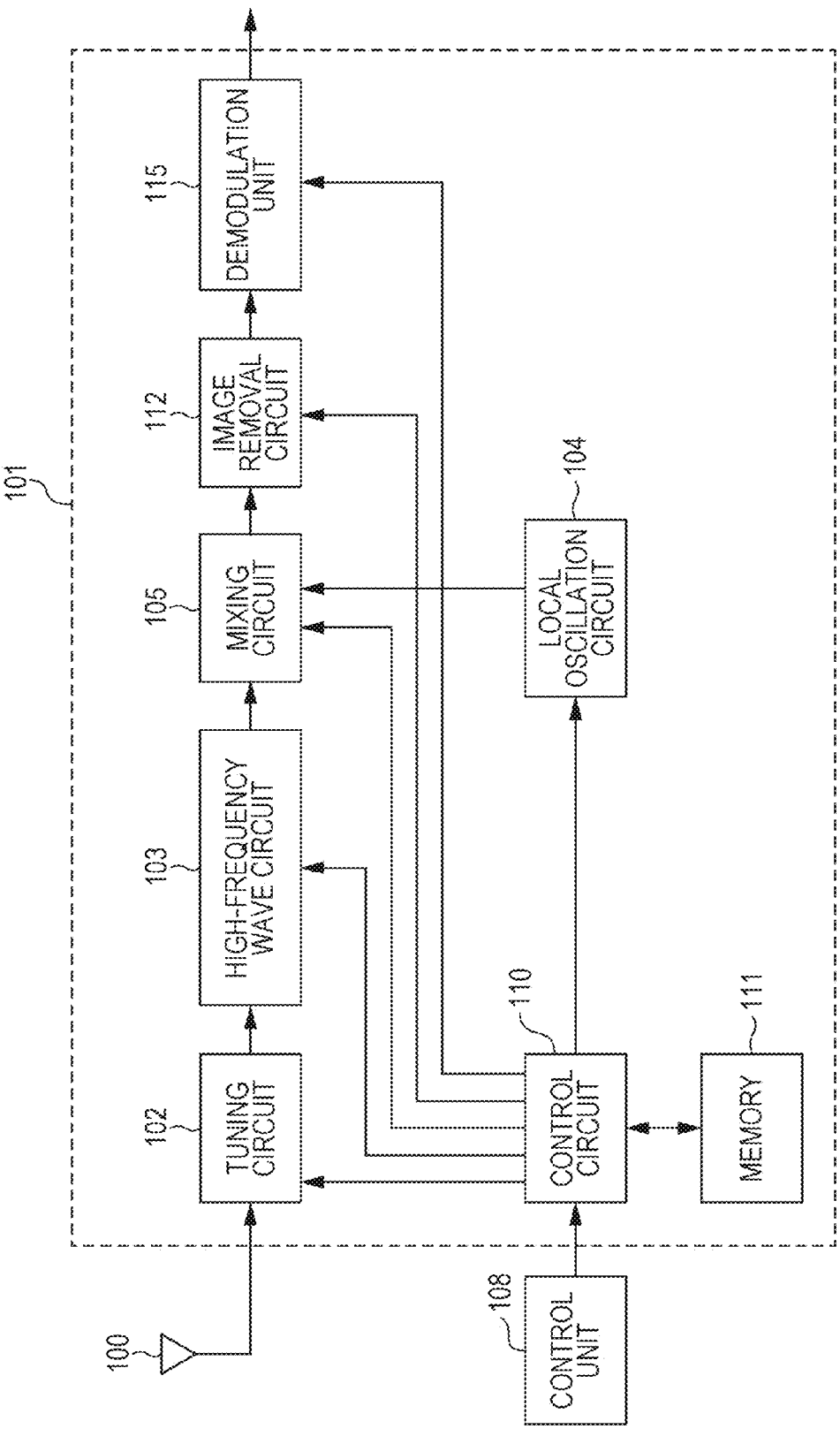
FIG. 28 is a block diagram that shows another configuration of a tuner module.

FIG. 28 shows a modification example of a tuner module in the eighth embodiment. The tuner module of FIG. 28 has a configuration in which the tuner and the demodulation unit are integrated. The control circuit 110 controls a block inside the tuner in the abovementioned manner. Furthermore, it is also possible for the control circuit 110 to control the demodulation unit 115 in addition to the abovementioned control.

During the channel scan, data that is required in the control of the demodulation unit 115 is saved in the memory 111 in advance from the control unit 108 using the control circuit 110. As a result of this, during start-up of the tuner and the demodulation unit, it is possible for the control circuit 110 to complete control that includes the memory 111 to the demodulation unit 115 automatically by calling up control data of the demodulation unit 115 in the same manner as that of other blocks from the memory 111.

Figure 29:
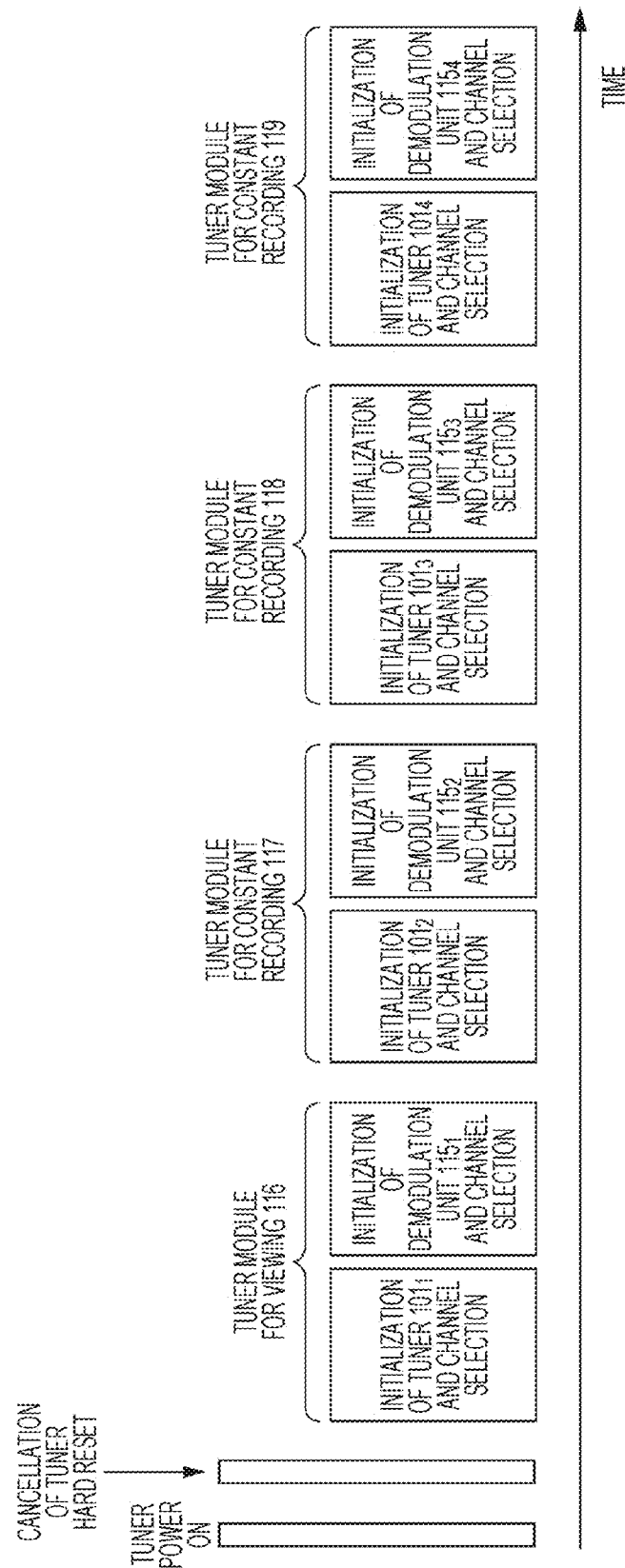
FIG. 29 is a schematic drawing that shows processes of a multi-tuner system of the related art.
Figure 30:
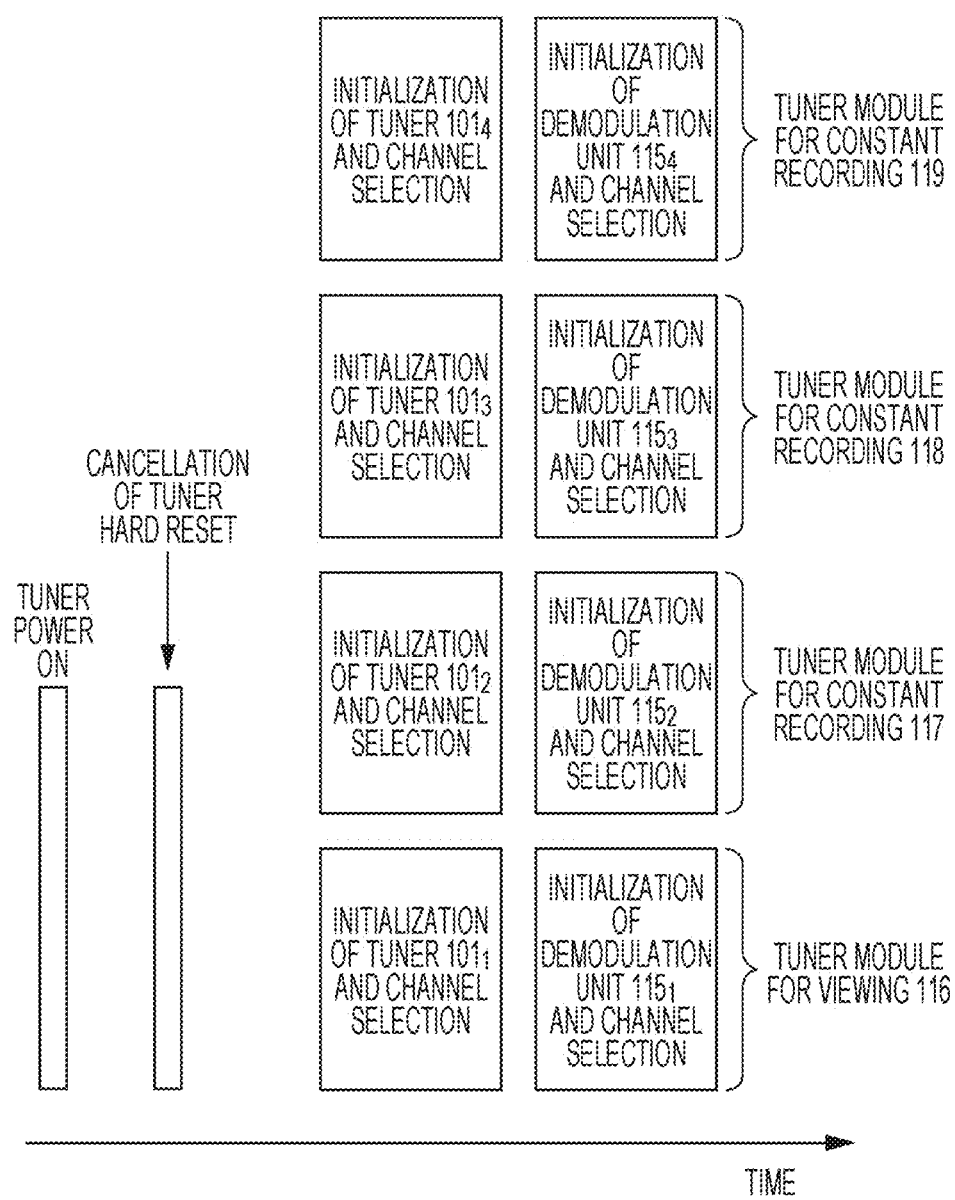
FIG. 30 is a schematic drawing that shows processes of the eighth embodiment of the present disclosure.

FIG. 29 and FIG. 30 are used in the description of the effects of the eighth embodiment of the present disclosure. FIG. 29 and FIG. 30 set a horizontal axis as time, and show the time taken from the powering on of a tuner until the completion of channel selection by all of the tuners. FIG. 29 shows the processes of a multi-tuner system of the related art in a schematic manner. In the case of the related art, it is necessary for the control unit to sequentially control the tuner modules one by one after hardware reset. Therefore, the time taken until the processes of all of the tuners are concluded is increased in proportion with the number of tuner modules. Therefore, a time taken until recording is initiated is increased, and therefore, a problem in that it is not possible for the control unit to perform other processes, arises.

As shown in FIG. 30, if the present disclosure is applied, it is set so that the channel selection operations of all of the tuners are initiated simultaneously after a tuner reset environment. Therefore, it is possible to reduce the time taken until the completion of channel selection by all of the tuners irrespective of the number of tuner modules.

9. Modification Example

The embodiments of the present disclosure are specifically described above, but the present disclosure is not limited to the abovementioned embodiments, and various modification are possible on the basis of the technical spirit of the present disclosure. For example, the configurations, methods, steps, shapes, materials, numerical values and the like that are included in the abovementioned embodiments are merely examples, and different configurations, methods, steps, shapes, materials, numerical values and the like may be used according to necessity.

In the present description, the internal memory and the control circuit of the terrestrial digital tuner are used, but it is possible to realize the present disclosure by causing these components to have the same functions inside the demodulation unit. Furthermore, it is also possible to achieve the present disclosure by installing a dedicated microcomputer outside for each tuner module for normal recording. Furthermore, the present disclosure is not only applicable to Japanese broadcasts, and can also be applied to digital broadcasts all over the world.

Additionally, it is possible for the present disclosure to have the following configurations.

(1) A television receiving apparatus including a receiving unit that receives expected waves, and a control unit that sets the receiving unit to an operational state that has a lower electricity consumption within a range in which reception performance is allowed, depending on interference waves with respect to the expected waves that the receiving unit receives.

(2) The television receiving apparatus according to (1), in which the receiving unit is set to the operational state that has a lower electricity consumption within a range in which reception performance is allowed, by the control unit when on stand-by for the reception of an emergency warning signal.

(3) The television receiving apparatus according to (1), in which a channel that has the expected waves and a signal strength of the corresponding channel are acquired by a channel scan, and acquired information is stored as channel scan data, and the control unit uses the channel scan data, and sets the receiving unit to an operational state that has a lower electricity consumption within a range in which reception performance is allowed, depending on a relationship between the expected waves and the interference waves.

(4) The television receiving apparatus according to (3), in which the receiving unit detects a level of interference waves by scanning frequency bands other than a primary frequency range during the channel scan, and stores detected interference waves as the channel scan data, and the control unit uses the channel scan data, and sets the receiving unit to an operational state that has a lower electricity consumption within a range in which reception performance is allowed, depending on a relationship between the expected waves and the interference waves.

(5) The television receiving apparatus according to (3), in which the television receiving apparatus further has a plurality of tuners, some tuners of the plurality of tuners detect a level of interference waves by scanning frequency bands other than a primary frequency range, or by residing in the frequency bands, and store detected interference waves as the channel scan data, and the control unit uses the channel scan data, and sets the receiving unit to an operational state that has a lower electricity consumption within a range in which reception performance is allowed, depending on a relationship between the expected waves and the interference waves.

(6) A television receiving apparatus including a plurality of tuners, in which, in a case in which a channel scan that investigates the presence or absence of expected waves in a first frequency range is performed, the first frequency range is divided into a plurality of second frequency ranges, and the plurality of tuners investigates the presence or absence of the expected waves by respectively scanning the plurality of second frequency ranges in a substantially simultaneous manner.

(7) A television receiving apparatus including one or a plurality of first tuners, and one or a plurality of second tuners, in which the first tuners detect the presence or absence of radio waves by scanning a predetermined frequency range, and store a list of detection results, and the second tuners detect the presence or absence of expected waves by referring to the stored list of detection results.

(8) A television receiving apparatus, in which the receiving unit has either a first setting state in which a noise factor is favorable, or a second setting state in which distortion characteristics are favorable, and, during the channel scan, channels in which both channels that are received in the first setting state and channels that are received in the second setting state are combined, are stored as the channel scan data.

(9) The television receiving apparatus according to (8), in which the television receiving apparatus further includes a plurality of tuners, in which first tuners among the plurality of tuners are set to a first setting state in which a noise factor is favorable, second tuners among the plurality of tuners are set to a second setting state in which distortion characteristics are favorable, and, during the channel scan, channels in which both channels that are detected by the first tuners and channels that are detected by the second tuners are combined, are stored as the channel scan data.

(10) The television receiving apparatus according to (9), in which the first and second tuners perform the channel scan in parallel.

(11) A television receiving apparatus including a plurality of tuners for simultaneously viewing and simultaneously recording a plurality of channels, in which a plurality of channels are simultaneously selected on the basis of channel selection information that is accommodated in a dedicated memory either inside or outside the tuners.

(12) A television receiving method which uses a receiving unit that receives expected waves, in which the method includes setting the receiving unit to an operational state that has a lower electricity consumption within a range in which reception performance is allowed, depending on interference waves with respect to the expected waves that the receiving unit receives.

(13) A television receiving method including dividing the first frequency range into a plurality of second frequency ranges in a case in which a channel scan that investigates the presence or absence of expected waves in a first frequency range is performed, and investigating the presence or absence of the expected waves by respectively scanning the plurality of second frequency ranges by a plurality of tuners in a substantially simultaneous manner.

(14) A television receiving method including detecting the presence or absence of radio waves by scanning a predetermined frequency range by first tuners among a plurality of tuners, and storing a list of detection results, and detecting the presence or absence of expected waves by referring to the stored list of detection results by second tuners among the plurality of tuners.

(15) A television receiving method including causing the receiving unit to have either a first setting state in which a noise factor is favorable, or a second setting state in which distortion characteristics are favorable, and, storing channels in which both channels that are received in the first setting state and channels that are received in the second setting state are combined as channel scan data during the channel scan.

REFERENCE SIGNS LIST

100 antenna
101$_1$ to 101$_N$ tuners
108 control unit
110 control circuit
111 memory
401 distributor
301 quaternary band-pass filter
303, 305 secondary band-pass filter

The invention claimed is:

1. A television receiving apparatus comprising:
a receiving unit that receives expected waves; and
a control unit that sets the receiving unit to an operational state that has a lower electricity consumption within a range in which reception performance is allowed, depending on interference waves with respect to the expected waves that the receiving unit receives, wherein
a channel that has the expected waves and a signal condition of the corresponding channel are acquired by a channel scan, and
acquired information is stored as channel scan data, and wherein
the control unit uses the channel scan data, and sets the receiving unit to an operational state that has a lower electricity consumption within a range in which reception performance is allowed, depending on a relationship between the expected waves and the interference waves.

2. The television receiving apparatus according to claim 1, wherein the receiving unit is set to the operational state that has a lower electricity consumption within a range in which reception performance is allowed, by the control unit when on stand-by for the reception of an emergency warning signal.

3. The television receiving apparatus according to claim 1,
wherein the receiving unit detects a level of interference waves by scanning frequency bands other than a primary frequency range during the channel scan, and stores detected interference waves as the channel scan data, and
wherein the control unit uses the channel scan data, and sets the receiving unit to an operational state that has a lower electricity consumption within a range in which reception performance is allowed, depending on a relationship between the expected waves and the interference waves.

4. The television receiving apparatus according to claim 1, further comprising a plurality of tuners,
wherein some tuners of the plurality of tuners detect a level of interference waves by scanning frequency bands other than a primary frequency range, or by residing in the frequency bands, and store detected interference waves as the channel scan data, and
wherein the control unit uses the channel scan data, and sets the receiving unit to an operational state that has a lower electricity consumption within a range in which reception performance is allowed, depending on a relationship between the expected waves and the interference waves.

5. The television receiving apparatus according to claim 1, wherein
a control circuit is connected to the control unit through a control line.

6. The television receiving apparatus according to claim 5, wherein
a determination signal is supplied to the control circuit from a signal determination device.

7. The television receiving apparatus according to claim 1, wherein
the receiving unit includes a tuned circuit configured to suppress the interference wave signals so that a ratio of levels of the interference wave signals with respect to levels of the expected waves signal becomes a desired value.

8. The television receiving apparatus according to claim 7, wherein
the tuned circuit comprises a band-pass filter configured from multiple stages.

9. The television receiving apparatus according to claim 1, wherein
the signal condition of the corresponding channel includes a signal strength of the corresponding channel.

10. A television receiving apparatus,
wherein a receiving unit has either a first setting state in which a noise factor is favorable, or a second setting state in which distortion characteristics are favorable, and
wherein, during a channel scan, channels in which both channels that are received in the first setting state and channels that are received in the second setting state are combined, are stored as a channel scan data.

11. The television receiving apparatus according to claim 10, further comprising a plurality of tuners,
wherein first tuners among the plurality of tuners are set to a first setting state in which a noise factor is favorable,
wherein second tuners among the plurality of tuners are set to a second setting state in which distortion characteristics are favorable, and
wherein, during the channel scan, channels in which both channels that are detected by the first tuners and channels that are detected by the second tuners are combined, are stored as the channel scan data.

12. The television receiving apparatus according to claim 11, wherein the first and second tuners perform the channel scan in parallel.

13. A television receiving method comprising:
causing a receiving unit to have either a first setting state in which a noise factor is favorable, or a second setting state in which distortion characteristics are favorable; and
storing channels in which both channels that are received in the first setting state and channels that are received in the second setting state are combined as channel scan data during a channel scan.

* * * * *